(12) United States Patent
Kamiyama et al.

(10) Patent No.: US 11,091,865 B2
(45) Date of Patent: Aug. 17, 2021

(54) CONTROL METHOD AND WASHING MACHINE

(71) Applicant: PANASONIC INTELLECTUAL PROPERTY MANAGEMENT CO., LTD., Osaka (JP)

(72) Inventors: Teruo Kamiyama, Osaka (JP); Mariko Nakaso, Shiga (JP); Hiroko Sugimoto, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 252 days.

(21) Appl. No.: 16/275,490

(22) Filed: Feb. 14, 2019

(65) Prior Publication Data

US 2019/0301068 A1    Oct. 3, 2019

(30) Foreign Application Priority Data

Apr. 3, 2018 (JP) .............................. JP2018-071774

(51) Int. Cl.
*D06F 33/44* (2020.01)
*G05B 15/02* (2006.01)
(Continued)

(52) U.S. Cl.
CPC .............. *D06F 33/44* (2020.02); *D06F 33/00* (2013.01); *D06F 33/50* (2020.02); *D06F 33/70* (2020.02); *D06F 34/05* (2020.02); *D06F 34/06* (2020.02); *D06F 34/14* (2020.02); *G05B 15/02* (2013.01); *D06F 2202/12* (2013.01); *D06F 2204/10* (2013.01); *D06F 2212/02* (2013.01)

(58) Field of Classification Search
CPC .......... D06F 33/00; D06F 33/44; D06F 33/50; D06F 33/70; D06F 34/05; D06F 34/06; D06F 34/14
See application file for complete search history.

(56) References Cited

U.S. PATENT DOCUMENTS

2010/0269266 A1* 10/2010 Lee ..................... D06F 33/36
                                                        8/159
2014/0156081 A1*  6/2014 Ha ....................... G05B 15/02
                                                        700/275
(Continued)

FOREIGN PATENT DOCUMENTS

JP        2002-101474         4/2002

OTHER PUBLICATIONS

Machine translation of JP 2002-101474 A to Mazda Motor Corp. (Year: 2002).*

*Primary Examiner* — Joseph L. Perrin
(74) *Attorney, Agent, or Firm* — Greenblum & Bernstein, P.L.C.

(57) ABSTRACT

A computer is used to obtain arrival time required for a user of a washing machine to arrive at an installation position of the washing machine based on a position of the user and the installation position, and when it is determined that the washing machine is performing washing based on operation information of the washing machine, when the arrival time is longer than washing completion time required for the washing machine to complete washing, to transmit instruction infomiation for adding a process of soaking laundry in water by the washing machine or for changing time in the process to the washing machine.

14 Claims, 12 Drawing Sheets

(51) Int. Cl.
  *D06F 33/00* (2020.01)
  *D06F 34/06* (2020.01)
  *D06F 34/05* (2020.01)
  *D06F 33/70* (2020.01)
  *D06F 34/14* (2020.01)
  *D06F 33/50* (2020.01)

(56) References Cited

U.S. PATENT DOCUMENTS

2014/0156082 A1\* 6/2014 Ha ................... H04L 12/2818
  700/275
2017/0081796 A1\* 3/2017 Belveal ................ D06F 34/05
2019/0032264 A1\* 1/2019 Bae .................... D06F 29/00

\* cited by examiner

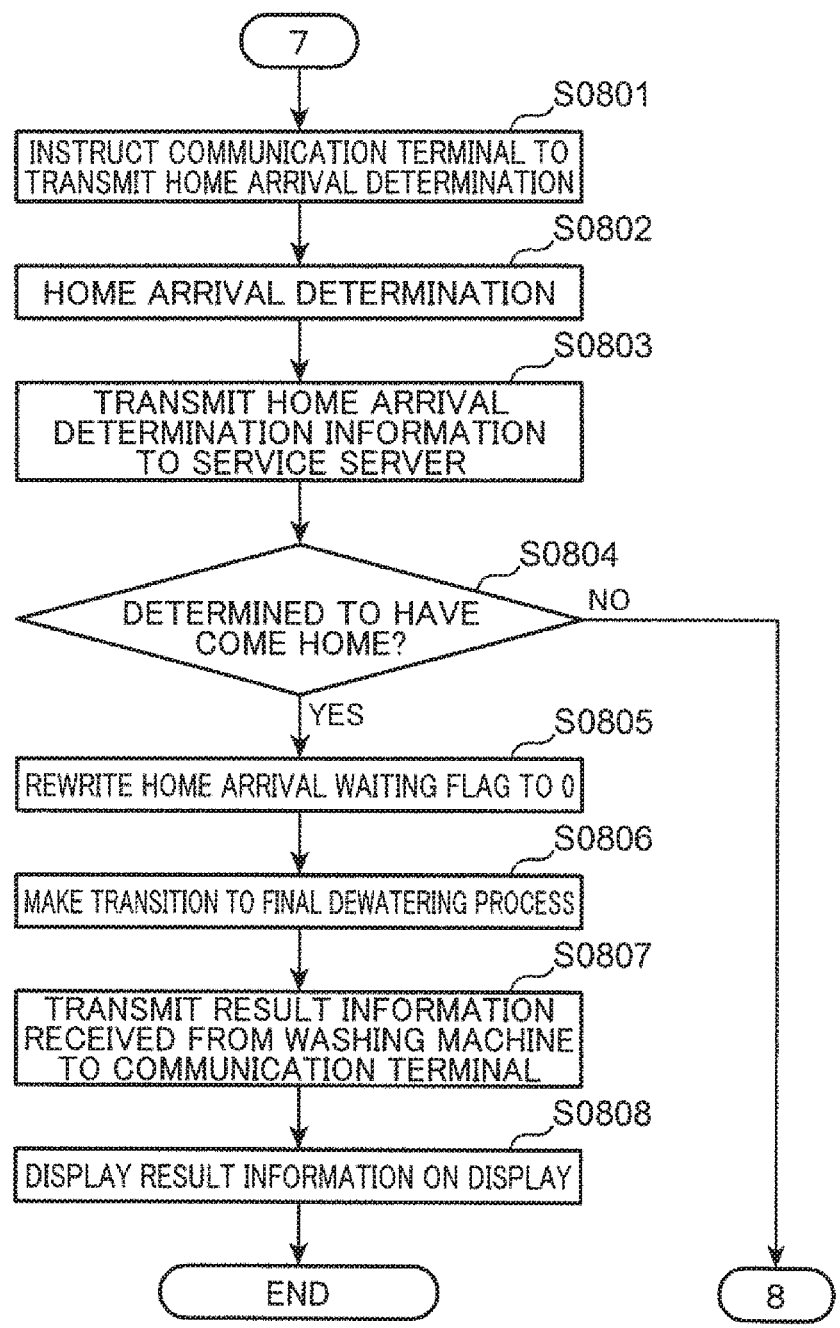

CONTROL METHOD AND WASHING MACHINE

FIELD OF THE INVENTION

The present disclosure relates to a control method for controlling a washing machine in a house to complete washing in time for user's arrival, and to the washing machine.

BACKGROUND ART

There have been conventionally proposed remote control systems which conduct remote control of electric apparatuses provided in a user's house by the user away from the user's house. In a remote control system, it is a common practice that a communication terminal, a typical example of which is a smartphone, conducts such control as reservation setting, change of reservation time, and change to a designated control state via a public telephone network for a home electric apparatus. It is also proposed to obtain positional information of a communication terminal being held by a user and change control of an electric apparatus in a user's house according to a current position of the user.

In the remote control system recited in Unexamined Japanese Patent Publication No. 2002-101474, when bringing an electric apparatus provided in a user's house into a designated control state by remote operation from a vehicle side, the electric apparatus is brought into a designated state when a user comes home, i.e., at the time of arrival of a user's vehicle at home. For example, at the time of remote control of a washing machine, washing is started such that washing is completed at the time of arrival at home by using an amount of laundry, information about a distance between a current vehicle and a user's house, and time zone information. When the user stops by or the like to stop the vehicle for a certain time period, the washing machine is temporarily stopped to adjust washing time by remote control.

It is known that generally, various bacteria grow to give out smell in laundry lett wet. In the technique disclosed in Unexamined Japanese Patent Publication No. 2002-401474, in a case where a user stops by or the like to extend assumed home arrival time, the washing machine is temporarily stopped to adjust washing time. However, when the washing machine is stopped not in a washing process but in a water discharge process or a dewatering process for a long period of time, laundry will be left wet to invite growth of various bacteria in laundry and give out smell.

SUMMARY OF THE INVENTION

The present disclosure aims at solving the above-described conventional problem and provides a control method of a washing machine which enables washing to be completed in time for arrival time required for user's arrival at an installation position of a washing machine, while suppressing growth of various bacteria in laundry after being washed, and the washing machine.

A control method according to one aspect of the present disclosure uses a computer to execute obtaining a position of a user of a washing machine and an installation position of the washing machine; obtaining arrival time required for the user to arrive at the installation position based on the position of the user and the installation position; obtaining operation information of the washing machine; determining whether the washing machine is performing washing based on the operation information; obtaining washing completion time required for the washing machine to complete washing when it is determined that the washing machine is performing washing; generating instruction information for adding a first washing process of soaking laundry in water by the washing machine or for changing time in the first washing process in a case where the arrival time is longer than the washing completion time; and transmitting the generated instruction information to the washing machine.

The comprehensive or specific aspect may be realized by a device, a system, an integrated circuit, a computer program or a computer-readable recording medium, and also may be realized by an arbitrary combination of a device, a system, an integrated circuit, a computer program, and a computer-readable recording medium. The computer-readable recording medium includes a non-volatile recording medium such as, for example, a CD-ROM (Compact Disc-Read Only Memory), and the like.

BRIEF DESCRIPTION OF THE DRAWINGS

FIG. 12 is a flow chart showing one example of operation conducted in a case where a home arrival waiting flag is set to 1.

Figure 1:
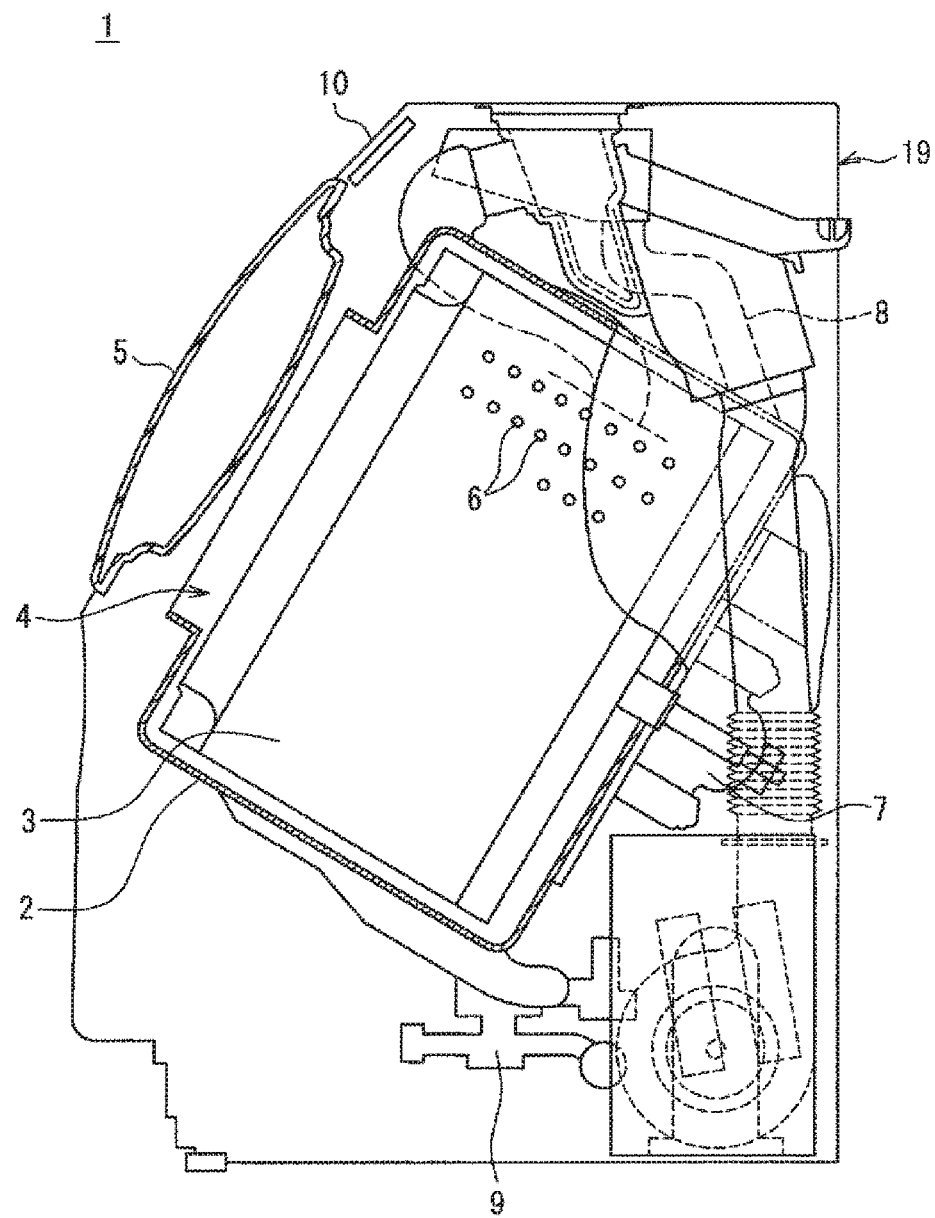
FIG. 1 is a sectional view showing a schematic configuration of a washing mchine in an embodiment of the present disclosure.

DESCRIPTION OF EMBODIMENTS (Knowledge on Which Present Disclosure is Based)

As described in the foregoing, there have been conventionally proposed remote control systems which conduct remote control of electric apparatuses provided in houses. For example, a remote control system is provided which conducts remote control of operation and stop of a washing machine according to estimated home arrival time of a user.

However, adjusting time of completion of washing by stopping a washing machine as in the above-described conventional technique may result in growing various bacteria in laundry depending on a process of washing being executed when the washing machine is stopped.

On the other hand, there is also proposed a washing machine regularly provided therein with detergent and softener, and having a function of automatically measuring necessary amounts of detergent and softener and putting the same at the time of washing. If a washing machine is regularly provided therein with detergent and softener, an appropriate amount of detergent and softener can be automatically put in by remote control without the user directly putting the detergent and softener into the washing machine. Accordingly, not only operation and stop of a washing machine but also more detailed control of the washing machine can be realized.

Therefore, an embodiment according to the present disclosure provides a control method, comprising the following executed using a computer: obtaining a position of a user of a washing machine and an installation position of the washing machine; obtaining arrival time required for the user to arrive at the installation position based on the position of the user and the installation position; obtaining operation information of the washing machine; determining whether the washing machine is performing washing based on the operation inthrmation; obtaining washing completion time required for the washing machine to complete washing when it is determined that the washing machine is performing washing; generating instruction information for adding a first washing process of soaking laundry in water by the washing machine or for changing time in the first washing process in a case where the arrival time is longer than the washing completion time; and transmitting the generated instruction information to the washing machine.

According to the present aspect, in a case where the washing machine is performing washing, when the arrival time required for the user to arrive at the installation position of the washing machine is longer than the washing completion time required for the washing machine to complete washing, instruction information for adding the first washing process of soaking laundry in water by the washing machine or for changing time in the first washing process is transmitted to the washing machine.

Therefore, when the arrival time is longer than the washing completion time, the washing machine can receive instruction information and add the first washing process of soaking laundry in water or change time in the first washing process according to the received instruction information. As a result, the washing machine can complete washing while avoiding laundry to be left in a semi-dried state.

Accordingly, according to the present aspect, washing can be completed in time for arrival time required for user's arrival at an installation position of the washing machine while suppressing growth of various bacteria in laundry after being washed.

Also in the above aspect, the first washing process may include a detergent soaking process of soaking laundry in water in which detergent is dissolved, and in a case where the arrival time satisfies a predetermined delay condition, instruction information for making transition to the detergent soaking process may be generated.

According to the present aspect, when the arrival time satisfies a predetermined delay condition, the washing machine can receive instruction information and make transition to the detergent soaking process according to the received instruction information. As a result, the washing machine can further suppress growth of various bacteria in laundry by soaking laundry in water in which detergent is dissolved.

Alternatively in the above aspect, the first washing process may include a detergent soaking process of soaking laundry in water in which detergent is dissolved, and in a case where the arrival time is longer than the washing completion time when the washing machine is in a washing process of washing laundry soaked in water in which detergent is dissolved or completes the washing process, instruction information for making transition to the detergent soaking process may be generated.

According to the present aspect, during the washing process of washing laundry soaked in water in which detergent is dissolved or at the completion of the washing process, when the arrival time is longer than the washing completion time, the washing machine can receive instruction information and make transition to the detergent soaking process according to the received instruction information. As a result, by soaking laundry in water in which detergent is dissolved, the washing machine can further suppress growth of various bacteria in laundry.

Alternatively, in the above aspect, the first washing process may include a water soaking process of soaking laundry in water, and in a case where the arrival time is longer than the washing completion time when the washing machine is in a water discharge process of discharging water from a washing tub, a dewatering process of dewatering laundry, or a rinsing process of rinsing laundry with water, or at the completion of the water discharge process, the dewatering process, or the rinsing process, instruction information for making transition to the water soaking process may be generated.

According to the present aspect, in a case where the arrival time is longer than the washing completion time when the washing machine is (i) in a water discharge process of discharging water from the washing tub, the dewatering process of dewatering laundry, or the rinsing process of rinsing laundry with water, or (ii) completes the water discharge process, the dewatering process, or the rinsing process, the washing machine can receive instruction information and make transition to the water soaking process according to the received instruction information. As a result, by soaking laundry in water, the washing machine can suppress growth of various bacteria in laundry.

In the above aspect, the predetermined delay condition may include a condition that the arrival time is longer than the washing completion time by predetermined first time or more.

According to the present aspect, when the arrival time is longer than the washing completion time by the predetermined first time or more, the washing machine can receive instruction information to make transition to the detergent soaking process according to the received instruction information. As a result, by soaking laundry in water in which detergent is dissolved, the washing machine can further suppress growth of various bacteria in laundry.

Alternatively, in the above aspect, the arrival time may be obtained at a predetermined time interval, and the predetermined delay condition may include a condition that the arrival time is not reduced by predetermined second time or more.

According to the present aspect, the washing machine can receive instruction information and make transition to the detergent soaking process according to the received instruction information when the arrival time is not reduced by the predetermined second time or more. As a result, by soaking laundry in water in which detergent is dissolved, the washing machine can further suppress growth of various bacteria in laundry.

In the above aspect, the washing completion time is time required for the washing machine to complete washing from a process preceding transition to the water soaking process, and when the arrival time becomes shorter than the washing completion time during the water soaking process, instruction information for making transition to a process preceding transition to the water soaking process may be generated.

According to the present aspect, during the water soaking process, when the arrival time becomes shorter than time required for the washing machine to complete washing from a process preceding transition to the water soaking process, the washing machine can receive instruction information and make transition to a process preceding transition to the water soaking process according to the received instruction information. As a result, the washing machine is allowed to resume washing of laundry in which growth of various bacteria is suppressed from the process preceding transition to the water soaking process.

Also in the above aspect, the washing completion time is time required for the washing machine to complete washing from a process subsequent to a washing process of washing laundry soaked in water in which detergent is dissolved, and when the arrival time becomes shorter than the washing completion time during the detergent soaking process, instruction information for making transition to a process subsequent to the washing process may be generated.

According to the present aspect, during the detergent soaking process, when the arrival time becomes shorter than time required for the washing machine to complete washing from a process subsequent to the washing process, the washing machine can receive instruction information to make transition to a process subsequent to the washing process according to the received instruction information. As a result, the washing machine is allowed to resume washing of laundry in which growth of various bacteria is suppressed from the process subsequent to the washing process of washing laundry soaked in water in which detergent is dissolved.

Alternatively, in the above aspect, at the completion of a process immediately preceding transition of the washing machine to a final dewatering process of dewatering laundry to complete washing, (i) in a case where a distance between the installation position and the position of the user is within a predetermined reference distance, instruction information for making transition to the final dewatering process may be generated, and (ii) in a case where the distance is out of the predetermined reference distance, instruction information for making transition to the water soaking process may be generated.

According to the present aspect, when the distance between the installation position and the position of the user is within a predetermined reference distance at the completion of a process immediately preceding transition to the final dewatering process, the washing machine can receive instruction information and make transition to the final dewatering process according to the received instruction information. As a result, the washing machine is allowed to execute or complete the final dewatering process when a user arrives at the installation position of the washing machine after a while after the transition to the final dewatering process.

On the other hand, in a case where the distance between the installation position and the position of the user is out of a predetermined reference distance at the completion of a process immediately preceding transition to the final dewatering process, the washing machine can receive instruction information and make transition to the water soaking process according to the received instruction information. This allows the washing machine to soak laundry after being washed in water without executing the final dewatering process when a user is expected not to arrive at the installation position of the washing machine for a while at the completion of a process immediately preceding transition to the final dewatering process. As a result, growth of various bacteria in laundry after being washed can be suppressed.

Also in the above aspect, after the transition to the water soaking process due to the distance being out of the reference distance, in a case where the distance becomes within the predetermined reference distance, instruction information for making transition to the final dewatering process may be generated.

According to the present aspect, when a distance between the installation position and the position of the user becomes within a predetermined reference distance after the transition to the water soaking process at the completion of a process immediately preceding transition to the final dewatering process, the washing machine can receive instruction information and make transition to the final dewatering process according to the received instruction information. As a result, when the user arrives at the installation position of the washing machine after a while after the transition to the water soaking process at the completion of a process immediately preceding transition to the final dewatering process, the washing machine is allowed to execute or complete the final dewatering process.

Also in the above aspect, in a case where elapsed time from the transition to the detergent soaking process becomes predetermined third time or more during the detergent soaking process, instruction information for making transition of the washing machine to a process subsequent to a washing process of washing laundry soaked in water in which detergent is dissolved may be generated.

According to the present aspect, when elapsed time from the transition to the detergent soaking process becomes predetermined third time or more during the detergent soaking process, the washing machine can receive instruction information and make transition to a process subsequent to the washing process of washing laundry soaked in water in which detergent is dissolved according to the received instruction information. As a result, the washing machine is allowed to resume washing of laundry in which growth of various bacteria is suppressed from the process subsequent to the washing process.

In the above aspect, in a case where elapsed time from the transition to the water soaking process becomes predetermined fourth time or more during the water soaking process, instruction information for making transition to a process preceding transition to the water soaking process may be generated.

According to the present aspect, when elapsed time from the transition to the water soaking process becomes predetermined fourth time or more during the water soaking process, the washing machine can receive instruction information and make transition to a process preceding the transition to the water soaking process according to the received instruction information. As a result, the washing machine is allowed to resume washing of laundry in which growth of various bacteria is suppressed from the process preceding the transition to the water soaking process.

Also in the above aspect, in a case where the arrival time is longer than the washing completion time, instruction information for making transition to a disinfection process of disinfecting laundry in a washing tub may be further generated.

According to the present aspect, in a case where the arrival time is longer than the washing completion time, the washing machine receives instruction information and adds the first washing process of soaking laundry in water or changes time in the first washing process according to the received instruction information, and further makes transition to the disinfection process of disinfecting laundry in the washing tub. As a result, the washing machine can suppress growth of various bacteria in laundry by disinfecting various bacteria in laundry in the washing tub.

Also in the above aspect, in a case where the arrival time satisfies a predetermined delay condition, instruction information for making transition to the disinfection process may be generated.

According to the present aspect, in a case where the arrival time satisfies a predetermined delay condition, the washing machine receives instruction information and makes transition to the disinfection process according to the received instruction information. As a result, the washing machine can further suppress growth of various bacteria in laundry by disinfecting laundry in the washing tub.

Also in the above aspect, further, in a case where, during the first washing process, the arrival time becomes shorter than time required for starting the final dewatering process after a process subsequent to the first washing process, instruction information for making transition to a process subsequent to the first washing process may be generated.

According to the present aspect, in a case where, during the first washing process, the arrival time becomes shorter than time required for starting the final dewatering process after a process subsequent to the first washing process, the washing machine receives instruction information and makes transition to a process subsequent to the first washing process according to the received instruction information. As a result, the washing machine is allowed to resume washing of laundry in which growth of various bacteria is suppressed from the process subsequent to the first washing process.

A washing machine according to another aspect of the present disclosure is a washing machine including a computer, wherein the computer is configured to: obtain a position of a user of the washing machine and an installation position of the washing machine, obtain arrival time required for the user to arrive at the installation position based on the position of the user and the installation position, obtain operation information of the washing machine, determine whether the washing machine is performing washing based on the operation information, obtain washing completion time required for the washing machine to complete washing when it is determined that the washing machine is performing washing, and add a first washing process of soaking laundry in water by the washing machine or change time in the first washing process in a case where the arrival time is longer than the washing completion time.

According to the present aspect, in a case where the washing machine is performing washing, if the arrival time required for the user to arrive at the installation position of the washing machine is longer than the washing completion time required for completing washing, the first washing process of soaking laundry in water by the washing machine is added or time in the first washing process is changed. As a result, the washing machine can complete washing while avoiding laundry to be left in a semi-dried state. Accordingly, according to the present aspect, washing can be completed in time for arrival time required for user's arrival at an installation position of the washing machine while suppressing growth of various bacteria in laundry after being washed.

First Embodiment

In the following, an embodiment of the present disclosure will be described with reference to the drawings.
(Schematic Configuration of Washing Machine 1)

Figure 2:
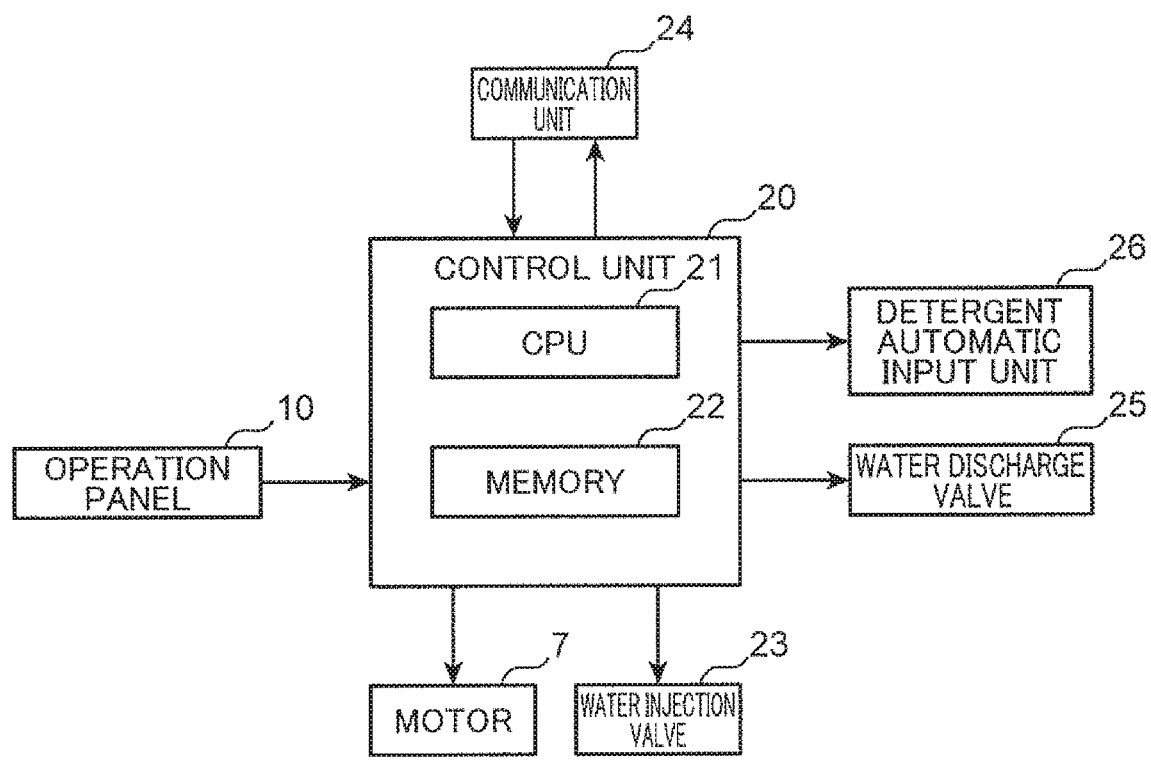
FIG. 2 is a block diagram showing a functional configuration of the washing machine.

FIG. 1 is a sectional view showing a schematic configuration of a washing machine 1 in an embodiment of the present disclosure. FIG. 2 is a block diagram showing a functional configuration of the washing machine 1. As shown in FIG. 1, the washing machine 1 is a so-called drum washing machine, and a washing tub 2 is supported hanging by a suspension structure having an antivibration structure in a washing machine main body 19 of the washing machine 1. In the washing tub 2, a drum 3 formed to have a bottomed tubular shape is supported so as to have an axial direction thereof tilted downward from a front side toward a rear side thereof. A clothes inlet/outlet 4 leading to an opening end of the drum 3 is formed on a front side of the washing tub 2. A user is allowed to put laundry into the drum 3 or take out the same therefrom via the clothes inlet/outlet 4 by opening/closing a door 5 which closes an opening so as to be opened/closed, the opening being provided on an upward inclined surface on a front side of the washing machine main body 19.

The drum 3 is driven to rotate in a forward rotation direction and a reverse rotation direction by a motor 7 attached to a rear side of the washing tub 2. A water injection pipe line 8 and a water discharge pipe line 9 are piped and connected to the washing tub 2, so that water supply into the washing tub 2 and water discharge therefrom are conducted by control of a water injection valve 23 (FIG. 2) and a water discharge valve 25 (FIG. 2).

When a user opens the door 5 to put laundry into the drum 3 and operates an operation panel 10 provided in an upper part of a front face of the washing machine main body 19 to start driving, a washing process of washing laundry soaked in water in which detergent is dissolved is started.

Specifically, in the washing process, a washing stirring process is executed after a washing water supply process of supplying a predetermined amount of water into the washing tub 2 from the water injection pipe line 8. In the washing stirring process, the drum 3 is driven to rotate by the motor 7. On this occasion, when detergent is regularly provided in a detergent input port (not shown), a predetermined amount of detergent is automatically input by a detergent automatic input unit 26 (FIG. 2). The operation panel 10 includes a display device such as a liquid crystal display or the like which displays, in addition to various kinds of switches for use in operation of the washing machine 1, a process during execution, execution time of each process, and remaining time before end of each process, and the like. Then, stirring operation is repeated. Stirring operation is operation of lifting up laundry housed in the drum 3 by rotation of the drum 3 in a rotation direction by stirring protrusions provided on an inner circumference wall of the drum 3, and making the lifted laundry fall down from a position of an appropriate height. As a result, beat wash effects are exerted on the laundry to realize washing.

When a predetermined time elapses, the washing process ends. Thereafter, a post-washing water discharge process (one example of a water discharge process) of discharging dirty washing liquid in the washing tub 2 from the water discharge pipe line 9, and an intermediate dewatering process (one example of a dewatering process) of rotating the drum 3 at a high-speed to rinse away washing liquid contained in laundry are executed. Thereafter, a rinsing process of rinsing laundry with water is executed.

In the rinsing process, similarly to the washing process, a rinsing water supply process of supplying a predetermined amount of water into the washing tub 2 from the water injection pipe line 8, a rinsing stirring process of repeating stirring operation, and a rinsing dewatering process of rinsing away washing liquid contained in laundry are repeated several times. This leads to execution of so-called rinsing of laundry.

When the rinsing process ends, a final dewatering process is executed. In the final dewatering process, after water used in the rinsing process is discharged from the water discharge pipe line 9, water contained in the laundry is dewatered by high-speed rotation of the drum 3. This leads to completion of washing.

In the following description, it is assumed that in the washing machine 1 having the above-described configuration, laundry such as clothing and the like put into the drum 3 is washed.

The washing machine 1 includes a control unit 20 (one example of a computer) and a communication unit 24 as shown in FIG. 2.

The control unit 20 is configured with a microcomputer provided with a CPU 21, a memory 22, and the like. In the memory 22, a control program for controlling operation of the entire washing machine 1 and data are recorded. The control unit 20 is connected to the above-described motor 7, operation panel 10, water injection valve 23, water discharge valve 25, detergent automatic input unit 26, and communication unit 24.

The control unit 20 conducts control of each process of washing according to instruction information input using the operation panel 10 and a control command received by the communication unit 24 to be described later. Specifically, the control unit 20 causes the motor 7 to rotate the drum 3, thereby conducting dewatering and stirring. The control unit 20 controls the water injection valve 23 to supply water into the washing tub 2 from the water injection pipe line 8 (FIG. 1). The control unit 20 controls the water discharge valve 25 to discharge water such as dirty washing liquid or the like in the washing tub 2. The control unit 20 controls the detergent automatic input unit 26 to put a predetermined amount of detergent regularly provided in the detergent input port (not shown) into the washing tub 2.

The communication unit 24 is configured with a communication interface circuit which conducts radio communication via a network according to radio communication standards such as Wi-Fi (registered trademark). The communication unit 24 may be configured with a communication interface circuit which conducts wire communication via a network according to wire communication standards such as the Ethernet (registered trademark).

Figure 4:
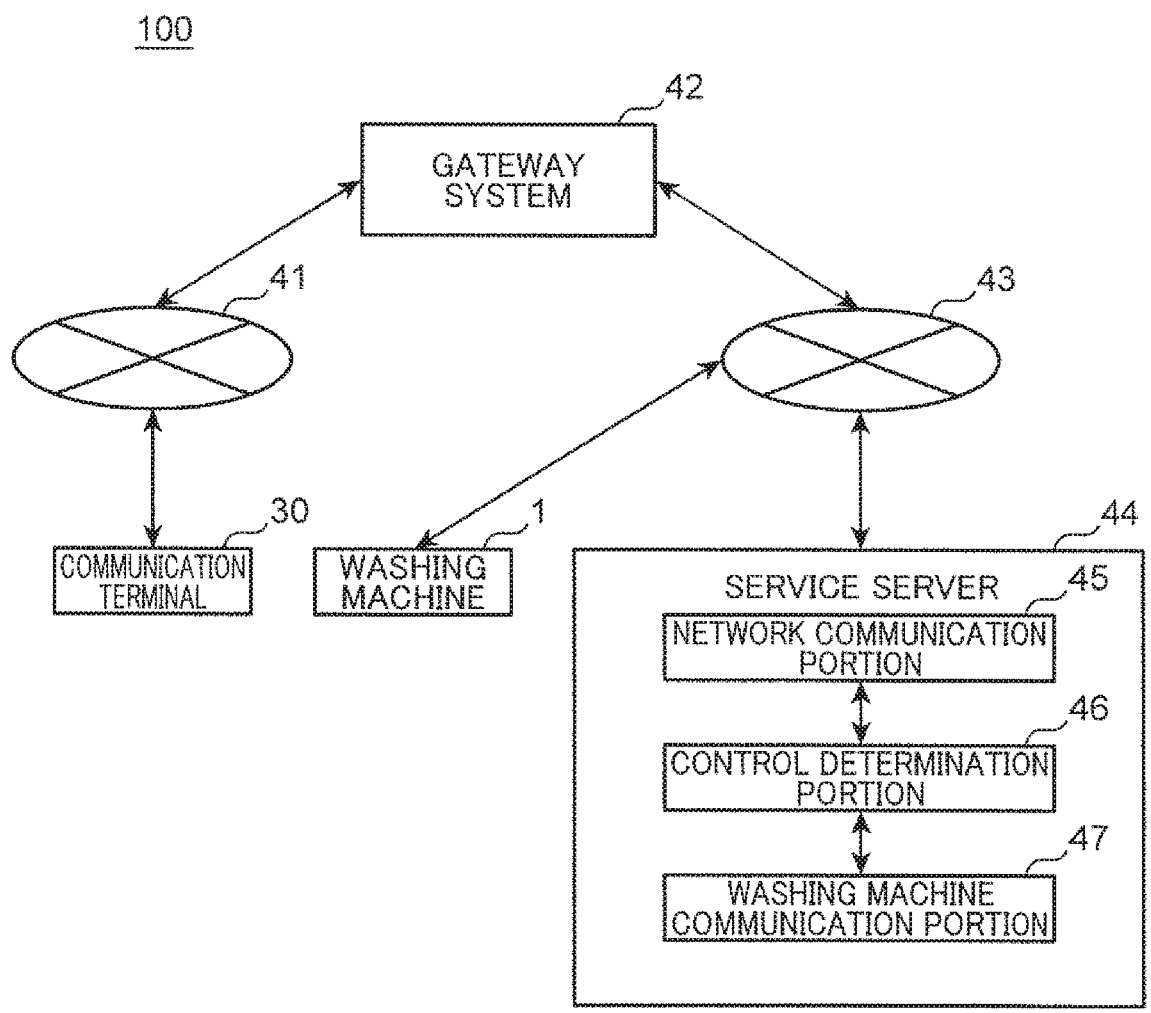
FIG. 4 is a schematic configuration diagram of the remote operation system of the washing machine.

The communication unit 24 receives a control command from an external communication terminal 30 or a service server 44 (FIG. 4) to he described later, and outputs the received control command to the control unit 20. Thereafter, the communication unit 24 receives result information from the control unit 20, and returns the received result information to the communication terminal 30 or the service server 44 as a transmission source of the control command (FIG. 4). The result information includes control result information indicative of a result of execution of control according to a control command, remaining washing time information indicative of remaining washing time (one example of washing completion time) required for the washing machine 1 to complete washing, status information (one example of operation information) indicative of a process (e.g. the washing process) being executed by the washing machine 1 and a completion time point of each process, and the like. A completion time point of each process is a time point before stall of a subsequent process after completion of each process.

When the washing machine 1 receives a control command from the service server 44 during a water soaking process to be described later, the control unit 20 sets, as remaining washing time, time required from a start time point of a process preceding transition to the water soaking process until completion of the washing. The control unit 20 also sets, as remaining washing time, time required from a start time point of the post-washing water discharge process as a process subsequent to the washing process until completion of the washing when the washing machine 1 receives a control command from the service server 44 during a detergent soaking process to be described later.

(Functional Configuration of Communication Terminal 30)

Figure 3:
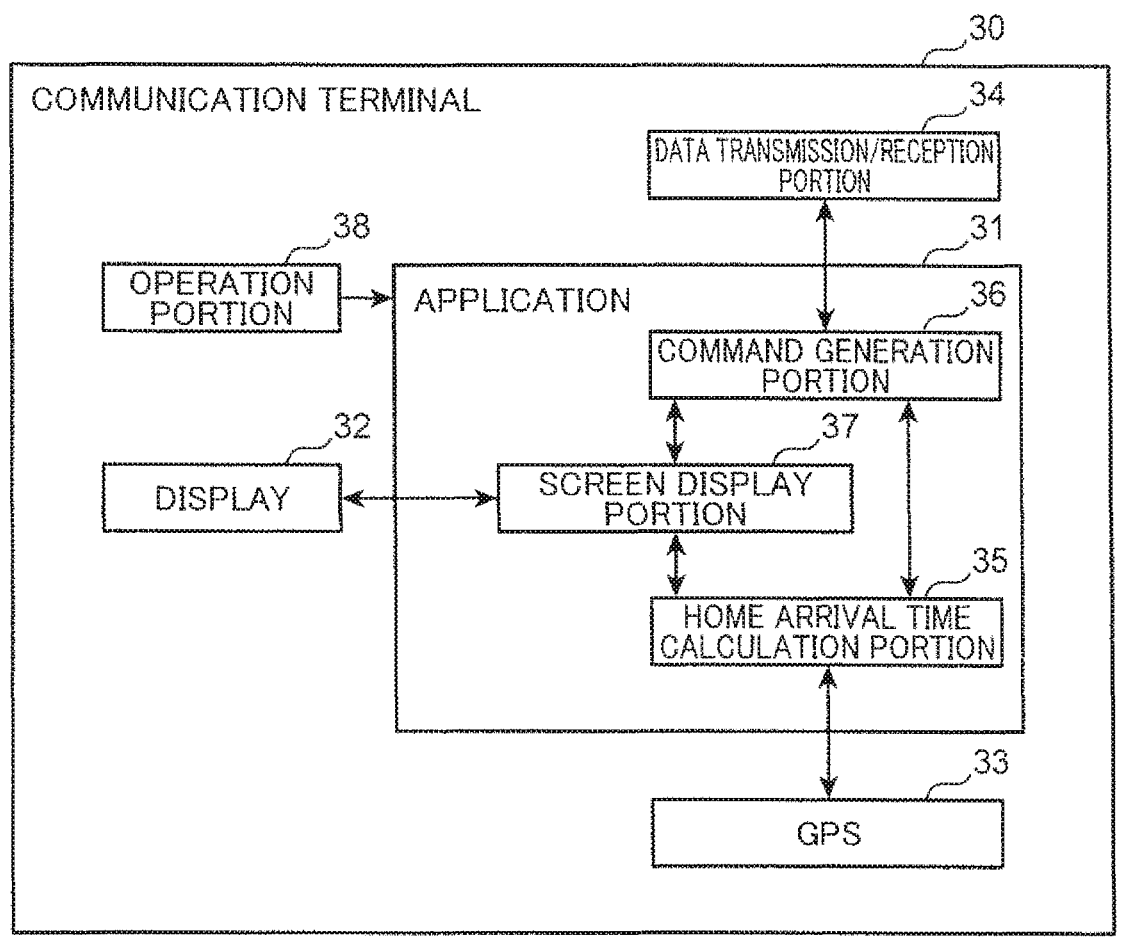
FIG. 3 is a block diagram showing a functional configuration of a communication terminal provided in a remote operation system of the washing machine.

FIG. 3 is a block diagram showing a functional configuration of the communication terminal 30 provided in a remote operation system 100 of the washing machine 1. As shown in FIG. 3, the communication terminal 30 includes a display 32, an operation portion 38, a GPS 33, an application 31, and a data transmission/reception portion 34.

The display 32, which is configured with a display device such as a liquid crystal display, or the like, displays information instructed by the application 31. The operation portion 38, which is configured with an operation device such as a touch panel and/or an operation button or the like, is used for operation of the communication terminal 30. The GPS 33 is configured with a reception circuit which receives a signal transmitted from a plurality of CPS satellites, an arithmetic circuit which conducts predetermined arithmetic processing, and the like. The GPS 33 calculates a current position of the communication terminal 30 based on a signal received from the plurality of UPS satellites and outputs positional information indicative of the calculated current position of the communication terminal 30.

The communication terminal 30, which includes a microcomputer (not shown) provided with a CPU, a memory, and the like, functions as the application 31 as a result of execution of an application program stored in the memory by the CPU. The application 31 receives an instruction input using the operation portion 38 to conduct remote control of the washing machine 1 via the data transmission/reception portion 34. The application 31 obtains positional information from the GPS 33.

The data transmission/reception portion 34 con rxnunicates with the washing machine 1 in a house and the service server 44 to be described later. The data transmission/reception portion 34 is configured with a communication interface circuit which communicates with the washing machine 1 and the service server 44 via a network according to communication standards such as the Ethernet, or the like.

The application 31 includes a home arrival time calculation portion 35, a command generation portion 36, and a screen display portion 37. The home arrival time calculation portion 35 obtains positional information from the GPS 33. Assuming that a user is present at the same position as that of the communication terminal 30, the home arrival time calculation portion 35 calculates home arrival time (one example of arrival time) required for a user to arrive home from a current position based on a distance between a user's current position (one example of a position of a user of a washing machine) indicated by obtained positional information and a position of a user's house (one example of the installation position of the washing machine) in which the washing machine 1 is installed, information indicative of a position of a user's house is input in advance using the operation portion 38 and is stored in the memory or the like provided in the communication terminal 30.

For example, at the time of calculating home arrival time, the home arrival time calculation portion 35 displays, on the display 32, a message which guides a user to select means of transportation (e.g. train, automobile and/or bicycle, etc.) for coming home. When the user selects means of transportation for coming home by using the operation portion 38, the home arrival time calculation portion 35 calculates, as home arrival time, time required for moving a distance between a current position of the communication terminal 30 and a position of the user's house at a travelling speed corresponding to the selected means of transportation. Travelling speeds corresponding to means of transportation are stored in advance in the memory or the like.

A method of calculating home arrival time by the home arrival time calculation portion 35 is not limited to the above method. For example, the home arrival time obtained by a user by using known route search service or the like may be input using the operation portion 38. Then, the home arrival time calculation portion 35 may receive and use the input home arrival time.

The command generation portion 36 generates a control command for remote control of the washing machine 1 and transmits the generated control command to the washing machine 1 via the data transmission/reception portion 34. The generated control command includes information indicative of a process of washing to be executed by the washing machine 1 and/or information indicative of an instruction to the washing machine 1 which is input by the user using the operation portion 38 and the like. The command generation portion 36 receives result information returned from the washing machine 1 via the data transmission/reception portion 34.

The command generation portion 36 also generates a control command for causing the service server 44 to conduct remote control of the washing machine 1, and transmits the generated control command to the service server 44 via the data transmission/reception portion 34. The generated control command includes home arrival time information indicative of home arrival time calculated by the home arrival time calculation portion 35, and the like. The command generation portion 36 receives result information returned from the service server 44 via the data transmission/reception portion 34.

The screen display portion 37 causes the display 32 to display a current state of the application 31 and an operation screen of the washing machine 1. When the home arrival time calculation portion 35 calculates home arrival time, the screen display portion 37 may cause the display 32 to display the calculated home arrival time. The screen display portion 37 also causes the display 32 to display result information received by the command generation portion 36. This informs the user of the received result information.
(Schematic Configuration of Remote Operation System 100)

FIG. 4 is a schematic configuration diagram of the remote operation system 100 of the washing machine 1. The remote operation system 100 includes the washing machine 1 as a remote operation target, and the communication terminal 30 owned by a user of the washing machine 1. The washing machine 1 is communicably connected to the service server 44 via the communication unit 24 (FIG. 2) and the Internet 43.

The Internet 43 and a public telephone network 41 provided by a telephone company are connected to each other by a gateway system 42. The public telephone network 41 includes a wireless telephone network (not shown) used for a wireless telephone such as a mobile phone, a smartphone, or the like.

The communication terminal 30 can be connected to the public telephone network 41 and conducts remote operation of the washing machine 1 via the public telephone network 41, the gateway system 42, the Internet 43, and the service server 44.

The service server 44 transmits/receives information to/from the communication terminal 30 connected to the public telephone network 41 via the Internet 43. The service server 44 includes a network communication portion 45, a washing machine communication portion 47, and a control determination portion 46 (one example of a computer).

The network communication portion 45 is configured with a communication interface circuit which conducts communication via the Internet 43 according to communication standards such as Wi-Fi, the Ethernet, or the like. The network communication portion 45 receives a control command generated by the communication terminal 30 via the Internet 43, and outputs the received control command to the control determination portion 46. The network communication portion 45 receives result information from the control determination portion 46 and transmits the received result information to the communication terminal 30 via the Internet 43.

The washing machine communication portion 47 is configured with a communication interface circuit which conducts communication via the Internet 43 according to communication standards such as Wi-Fi, the Ethernet, or the like. The washing machine communication portion 47 transmits a control command to the washing machine 1 via the Internet 43 and receives result information from the washing machine 1.

The network communication portion 45 and the washing machine communication portion 47 may be configured with the same communication interface circuit or individually configured with communication interface circuits different from each other.

The service server 44, which includes a microcomputer (not shown) provided with a CPU, a memory, and the like, functions as the control determination portion 46 as a result of execution of a control program stored in the memory by the CPU.

The control determination portion 46 obtains home arrival time information included in a control command input from the network communication portion 45. After transmitting a control command indicative of a transmission instruction of remaining washing time information and the status information to the washing machine 1 via the washing machine communication portion 47, the control determination portion 46 also obtains the remaining washing time information and the status information included in the result information received via the washing machine communication portion 47. The control determination ortion 46 generates a control command for remote control of the washing machine 1 based on the obtained home arrival time information, remaining washing time information and status information. After transmitting the generated control command to the washing machine 1 via the washing machine communication portion 47, the control determination portion 46 receives result information via the washing machine communication portion 47.
(One Example of Remote Control Method of Washing Machine 1)

Next, one example of a remote control method of the washing machine 1 will be described. In the present example, it is assumed that the process of washing includes the above-described washing process (the washing water supply process and the washing stirring process), post-washing water discharge process, intermediate dewatering process, rinsing process (the rinsing water supply process, the rinsing stirring process, and the rinsing dewatering process), and final dewatering process, and each process is executed in this order.

It is also assumed that control is conducted to start the final dewatering process as a final process of washing upon user's arrival at home. The reason for control to start the final dewatering process upon arrival of a user at home is that because few users go to the washing machine 1 to take out laundry therefrom right after the arrival at home, it is considered not necessary to complete the final dewatering process simultaneously with the user's arrival at home. Accordingly, in the following description of the embodiment, it is assumed that completion of washing represents a time point of completion of a process (the rinsing process in the present embodiment) immediately preceding transition to the final dewatering process.

First, a user operates the operation panel 10 of the washing machine 1 to make a washing reservation. Specifically, when making a washing reservation, the user operates the operation panel 10 to input washing start time or washing completion time. The control unit 20 stores the input washing start time or completion time in the memory 22. As a result of the foregoing operation, washing start time or completion time is set in the washing machine 1.

The control unit 20 also transmits a control command to the communication terminal 30 via the communication unit 24, the control command instructing to set, to the communication terminal 30, washing start time or completion time which has been set in the washing machine 1. In the communication terminal 30, the application 31 stores washing start time or completion time in a memory (not shown) provided in the communication terminal 30 according to the control command received via the data transmission/reception portion 34. As a result of the foregoing operation, washing start time or completion time is set also in the communication terminal 30 to end the washing reservation.

A washing reservation may be made by operation, not limited to operation of the operation panel 10 of the washing machine 1, of the operation portion 38 of the communication terminal 30. Specifically, when a user operates the operation portion 38 to input washing start time or washing completion time, the application 31 stores the input washing start time or completion time in the memory of the communication terminal 30. Together with the storage, the application 31 may transmit, to the washing machine 1 via the data transmission/reception portion 34, a control command instructing on setting of the input washing start time or completion time. Along with the transmission, in the washing machine 1, the control unit 20 may store washing start time or completion time in the memory 22 according to the control command received via the communication unit 24.

After making a washing reservation, the user goes out of the user's house while carrying the communication terminal 30. It is assumed that after the user goes out, there arrives, in the communication terminal 30, washing start time set by making a washing reservation or time that is before the set washing completion time by the washing time (hereinafter, estimated start time). At this time, the home arrival time calculation portion 35 calculates home arrival time by obtaining positional information from the GPS 33, and the like as described above. Washing time (one example of washing completion time) represents time obtained by subtracting time required for the final dewatering process from time required for the entire processes of washing. Washing time is stored in advance in the memory or the like provided in the communication terminal 30.

In a case where the washing time is longer than the home arrival time calculated by the home arrival time calculation portion 35, the application 31 does not conduct processing in particular. In this case, in the washing machine 1, washing is started according to the washing reservation. In a case where the calculated home arrival time is longer than the washing time, the home arrival time calculation portion 35 may cause the display 32 to display a message proposing delay of start of the washing via the screen display portion 37.

Even after the washing is started according to the reservation, the home arrival time calculation portion 35 periodically obtains positional information from the GPS 33. An interval for obtaining positional information may be set by operation of the operation 38 by a user. After calculation of home arrival time by the home arrival time calculation portion 35, the command generation portion 36 generates a control command including home arrival time information indicative of the calculated home arrival time. Then, the command generation portion 36 transmits the generated control command to the service server 44 via the data transmission/reception portion 34.

When the network communication portion 45 receives a control command generated by the command generation portion 36, the service server 44 obtains home arrival time information included in the received control command. Also after transmitting a control command indicative of a transmission instruction of remaining time information and status information to the washing machine 1 via the washing machine communication portion 47, the service server 44 obtains remaining washing time information and status information included in result information returned from the washing machine 1. Then, the service server 44 adjusts washing time so as to suppress growth of various bacteria in laundry based on the obtained home arrival time information, remaining washing time information, and status information. In the washing time adjustment, the service server 44 conducts individual adjustment for each process so as not to leave laundry in contact with air for a long period of time. A method of the adjustment of time for each process will be described later.

The home arrival time calculation portion 35 may transmit not a control command but only home arrival time information to the service server 44. Responsively, when the network communication portion 45 receives only home arrival time information generated by the command generation portion 36, the service server 44 may obtain the transmitted home arrival time information. Additionally, the above processing of the application 31 of the communication terminal 30 may be conducted by the service server 44.

At the completion of a process immediately preceding transition to the final dewatering process, the home arrival time calculation portion 35 again obtains positional information from the GPS 33. When a user's current position indicated by the obtained positional information is within a predetermined range from a user's house, the final dewatering process is started in the washing machine 1 assuming that the user has come home. By contrast, in a case where no determination is made that the user has come home, adjustment of washing time is again conducted.

(Outline of Time Adjustment Method for Each Process)

Next, outline of time adjustment method for each process of washing in the present embodiment will be described. As described above, the process of washing includes the washing process (the washing water supply process and the washing stirring process), the post-washing water discharge process, the intermediate dewatering process, the rinsing process (the rinsing water supply process, the rinsing stirring process, and the rinsing dewatering process), and the final dewatering process, and the control unit 20 executes each process in this order.

The washing process includes the washing water supply process of supplying water into the washing tub 2, and the washing stirring process of rotating the drum 3 in the washing tub 2 with laundry soaked in water in which detergent is dissolved and stirring the laundry to remove stains. After the washing stirring process, the post-washing water discharge process of discharging water containing detergent is executed.

In the intermediate dewatering process, the control unit 20 causes the drum 3 in the washing tub 2 to rotate to dewater detergent liquid contained in laundry in order to reduce a detergent component contained in laundry before the rinsing process.

The rinsing process includes the rinsing water supply process of supplying water to the washing tub 2 after completion of the intermediate dewatering process, the rinsing stirring process of causing the drum 3 to rotate to stir and rinse laundry after the rinsing water supply process, and the rinsing dewatering process of rinsing away washing liquid contained in laundry. The number of times to execute the rinsing process can be set by a user.

The final dewatering process is a final process of washing. In the final dewatering process, after discharging water used in the rinsing process immediately preceding transition to the final dewatering process, the control unit 20 causes the drum 3 in the washing tub 2 to rotate to reduce a water content in laundry.

During the washing process, in a case where home arrival time becomes longer than remaining washing time (one example of washing completion time), the control unit 20 does not adjust the washing time. The remaining washing time is time required from the present to a completion time point of the rinsing process immediately preceding transition to the final dewatering process.

At the completion of the washing process, in a case where the home arrival time is longer than the remaining washing time, the control unit 20 stops the washing machine 1 without causing the washing machine to transition to the subsequent post-washing water discharge process. As a result, the control unit 20 causes the washing machine 1 to make a direct transition to the detergent soaking process (one example of a first washing process). The remaining washing time herein is time from a start time point of the post-washing water discharge process until a completion time point of the rinsing process immediately preceding transition to the final dewatering process. The detergent soaking process is a process of soaking laundry in water in which detergent is dissolved. This control prevents growth of various bacteria by soaking laundry in water in which detergent is dissolved. During the detergent soaking process, in a case where the home arrival time becomes shorter than the remaining washing time, the control unit 20 causes the washing machine 1 to transition to the post-washing water discharge process which is a process subsequent to the washing process.

During the post-washing water discharge process, in a case where the home arrival time becomes longer than the remaining washing time, the control unit 20 causes the washing machine 1 to interrupt the post-washing water discharge process and supply water to an extent that the whole laundry is soaked in water and causes the washing machine 1 to transition to the water soaking process (one example of the first washing process). Also, at the completion of the post-washing water discharge process, in a case where the home arrival time is longer than the remaining washing time, the control unit 20 causes the washing machine 1 to supply water to an extent that the whole laundry is soaked in water and make transition to the water soaking process. The water soaking process is a process of soaking laundry in water. The control enables growth of various bacteria in laundry to be prevented, the growth being caused by leaving the laundry in a semi-dried state after discharge of water in the washing tub 2.

During the water soaking process, in a case where the home arrival time becomes shorter than the remaining washing time, the control unit 20 causes the washing machine 1 to resume washing from the post-washing water discharge process preceding transition to the water soaking process. The remaining washing time herein is time from a start time point of the post-washing water discharge process until a completion time point of the rinsing process immediately preceding transition to the final dewatering process.

During the intermediate dewatering process, in a case where the home arrival time becomes longer than the remaining washing time, the control unit 20 causes the washing machine 1 to interrupt the intermediate dewatering process and causes the washing machine 1 to transition to the water soaking process similarly to the post-washing water discharge process. Also, at the completion of the intermediate dewatering process, in a case where the home arrival time is longer than the remaining washing time, the control unit 20 supplies water to an extent that the whole laundry is soaked in water, and causes the washine machine 1 to transition to the water soaking process.

During the water soaking process, in a case where the home arrival time becomes shorter than the remaining washing time, the control unit 20 causes the washing machine 1 to resume washing from the intermediate dewatering process preceding transition to the water soaking process after discharge of water in the washing tub 2. The remaining washing time herein is a total of the time required for water discharge and time from a start time point of the intermediate dewatering process until a completion time point of the rinsing process immediately preceding transition to the final dewatering process.

During the rinsing process, in a case where the home arrival time becomes longer than the remaining washing time, the control unit 20 causes the washing machine 1 to interrupt the rinsing process and supply water to an extent that the whole laundry is soaked in water, and causes the washing machine 1 to transition to the water soaking process.

During the water soaking process, in a case where the home arrival time becomes shorter than the remaining washing time, the control unit 20 causes the washing machine 1 to resume washing from the rinsing process preceding transition to the water soaking process. At the time of causing the washing machine 1 to transition to the water soaking process, in a case where water is supplied to an extent that the whole laundry is soaked in water because the rinsing water supply process is yet to be completed, the control unit 20 discharges water so as to have an amount of water optimum for the rinsing process before resuming washing from the rinsing process. The remaining washing time herein is a total of the time required for water discharge and time from a start time point of the rinsing process to a completion time point of the rinsing process immediately preceding transition to the final dewatering process.

At a completion time point of the rinsing process immediately preceding transition to the final dewatering process as a final process, determination is made as to whether or not a distance between a user's current position and the user's house is within a predetermined reference distance. As a result of the determination, when the distance is within the reference distance, the control unit 20 causes the washing machine 1 to start the final dewatering process, and when the distance is out of the reference distance, the control unit 20 causes the washing machine 1 to stop operation without discharging water in the washing tub 2.

In the above-described method, the control unit 20 causes the washing machine 1 to transition to the water soaking process in order to suppress growth of various bacteria. However, in a case where the washing machine 1 is configured to be capable of executing a disinfection process of disinfecting and/or sterilizing the inside of the washing tub 2, the control unit 20 may cause the washing machine 1 to interrupt the water soaking process and cause the washing machine 1 to transition to the disinfection process.

The foregoing is a basic method of adjusting washing time for each process of washing in the present embodiment, which is an adjustment method coping with home arrival time varying more or less. However, for example, means of transportation may be paralyzed during the intermediate dewatering process to cause considerable delay of home arrival time of a user. In such a case of considerable delay of home arrival time, in the above-described adjustment method, laundry will be soaked in water for a long period of time, so that various bacteria might grow in laundry.

Therefore, in the present embodiment, for preventing growth of various bacteria in laundry even when home arrival time is considerably delayed, the control unit 20 causes the washing machine 1 to execute detergent automatic input processing and causes the washing machine 1 to transition to the detergent soaking process. The detergent automatic input processing is processing of automatically inputting a predetermined amount of detergent into the washing tub 2 by the detergent automatic input unit 26 (FIG. 2).

Specifically, after the completion of the washing process, in a case where home arrival time is considerably delayed during each of processes from the post-washing water discharge process as a subsequent process until the rinsing process, the control unit 20 causes the washing machine 1 to execute the detergent automatic input processing and causes the washing machine 1 to transition to the detergent soaking process. In the detergent soaking process, the control unit 20 first causes the washing machine 1 to discharge water in the washing tub 2, and thereafter, while executing the detergent automatic input processing to input detergent to the washing tub 2, to supply water to an extent that laundry in the washing tub 2 is soaked in water.

Considerable delay of home arrival time can be determined by, for example, home arrival time becoming predetermined first time or more. The first time is determined in advance to be, for example, time (e.g. 30 minutes) shorter than time (e.g. 45 minutes) which is generally required from start to completion of washing. Also, the first time can be set by user's operation.

Alternatively, it is also possible to obtain home arrival time at a predetermined time interval and in a case where the home arrival time is not reduced by predetermined second time or more, determine that the home arrival time is considerably delayed. The second time may be the same as the first time or may be set by user's operation.

After the transition of the washing machine 1 to the detergent soaking process, in a case where the home arrival time becomes shorter than time from a start time point of the post-washing water discharge process to a completion time point of the rinsing process, the control unit 20 causes the washing machine to transition to the post-washing water discharge process subsequent to the washing process.

In a case where elapsed time from the transition to the detergent soaking process becomes predetermined third time or more, the control unit 20 interrupts the detergent soaking process to make transition to the post-washing water discharge process as a process subsequent to the washing process and complete the washing. The third time may be also set by user's operation. This control can prevent laundry from being soaked in detergent for a long period of time.

Similar to the above, in a case where elapsed time from the transition to the water soaking process becomes predetermined fourth time, the control unit 20 interrupts the water soaking process to make transition to a process preceding transition to the water soaking process and complete the washing. The fourth time may be also set by user's operation. This control can prevent laundry from being soaked in water for a long period of time.

As described in the foregoing, even when home arrival time of a user changes, the user can complete laundry with the final dewatering process after coming home while preventing growth of various bacteria by control of the washing machine 1.

(Overall Operation of Remote Operation System 100)

Figure 5:
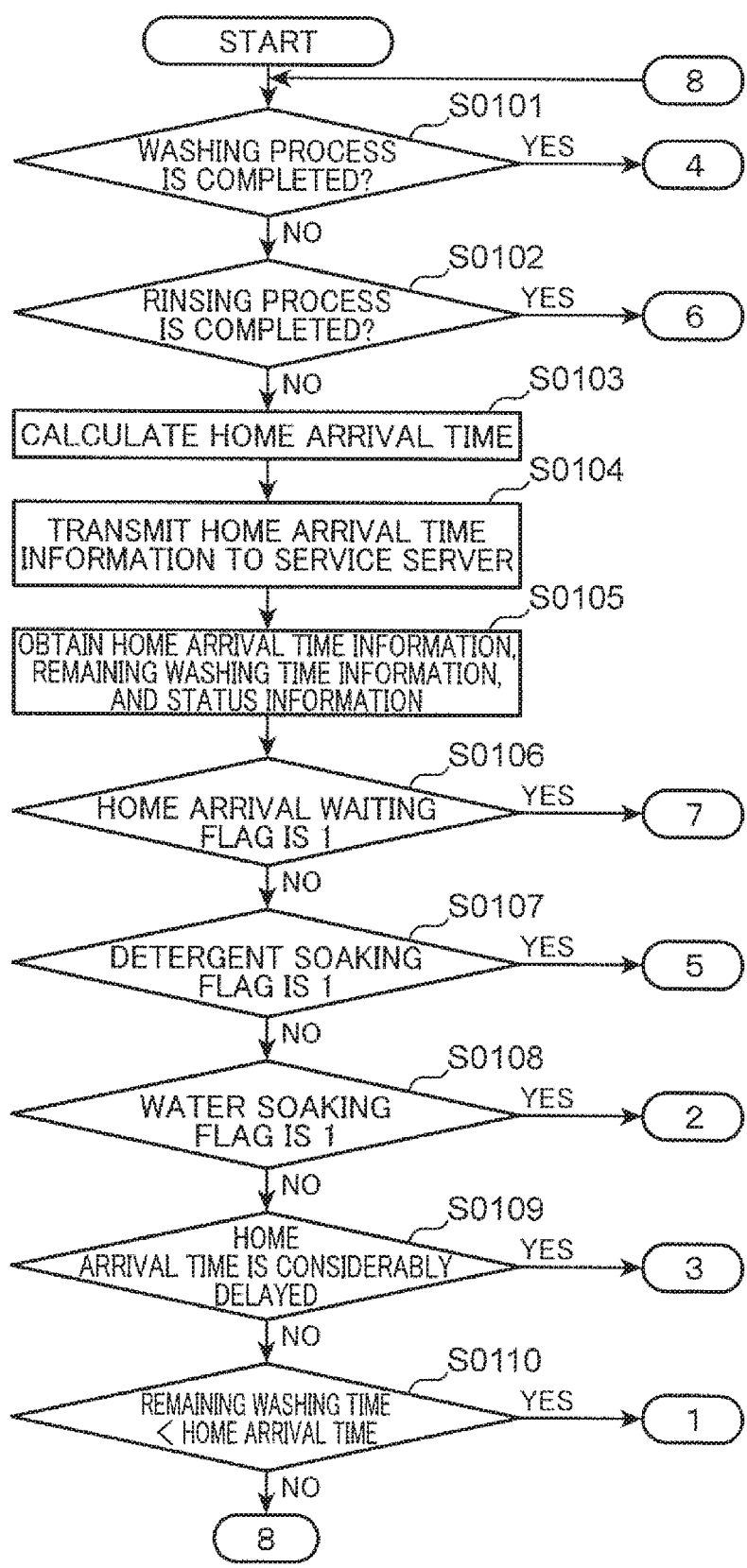
FIG. 5 is a flow chart showing one example of overall operation of the remote operation system of the washing machine.

Next, overall operation of the remote operation system 100 will be described. FIG. 5 is a flow chart showing one example of overall operation of the remote operation system 100. As described above, when a user makes a washing reservation, washing start time or completion time input at the time of making the washing reservation is stored in the memory 22 of the washing machine 1 and in the memory of the communication terminal 30. Then, when the present time becomes the washing start time stored in the memory or the estimated start time that is before the washing completion time stored in the memory by washing time, the operation shown in FIG. 5 is started.

It is assumed that the operation shown in FIG. 5 is started, and in the service server 44, the control determination portion 46 does not receive, from the washing machine 1, a control command including status information indicative of a completion time point of the washing process (NO in Step S0101), and does not receive a control command including status information indicative of a completion time point of the rinsing process (NO in Step S0102).

In this case, as described above, after obtaining positional information indicative of a current position of the communication terminal 30 from the GPS 33, the home arrival time calculation portion 35 calculates home arrival time based on a distance between a position of a user's house and a current position of the user (Step S0103).

The command generation portion 36 generates a control command for causing the service server 44 to remote-control the washing machine 1, the control command including home arrival time information indicative of the home arrival time calculated in Step S0103. Then, the command generation portion 36 transmits the generated control command to the service server 44 via the data transmission/reception portion 34 (Step S0104). The home arrival time information may be transmitted to the service server 44 at a predetermined time interval, separately from the control command.

In the service server 44, the control determination portion 46 obtains home arrival time information, remaining washing time information, and status information (Step S0105).

Specifically, in Step S0105, when receiving the control command transmitted in Step S0104 via the network communication portion 45, the control determination portion 46 obtains home arrival time information included in the received control command. Then, the control determination portion 46 generates a control command indicative of a transmission instruction of remaining washing time information and status information, and transmits the generated control command to the washing machine 1 via the washing machine communication portion 47. In the washing machine 1, when receiving the transmitted control command via the communication unit 24, the control unit 20 returns result information including remaining washing time information and status information to the service server 44. When receiving the returned result information via, the washing machine communication portion 47, the control determination portion 46 obtains the remaining washing time information and the status information included in the received result information. The remaining washing time and the status information may be transmitted to the service server 44 at a predetermined time interval irrespective of reception of a control command. This enables the control determination portion 46 to obtain latest home arrival time information and status information at a predetermined time interval. The predetermined time interval is determined to be, for example, one minute or the like. The predetermined time interval can be varied.

Then, the control determination portion 46 determines contents of remote control of the washing machine 1 based on the home arrival time information, the remaining washing time information, and the status information obtained in Step S0105 (Steps S0106 to S0110). Steps S0106 to S0109 will be described later, and the processing in Step S0110 and the following steps will be first described.

(Control of Transition to Water Soaking Process)

In Step S0110, the control determination portion 46 determines whether or not home arrival time indicated by the home arrival time information is longer than remaining washing time indicated by the remaining washing time information (Step S0110). In Step S0110, when it is determined that the home arrival time is equal to or less than the remaining washing time (NO in Step S0110), the processing in Step S0101 and the following steps will be executed.

Figure 6:
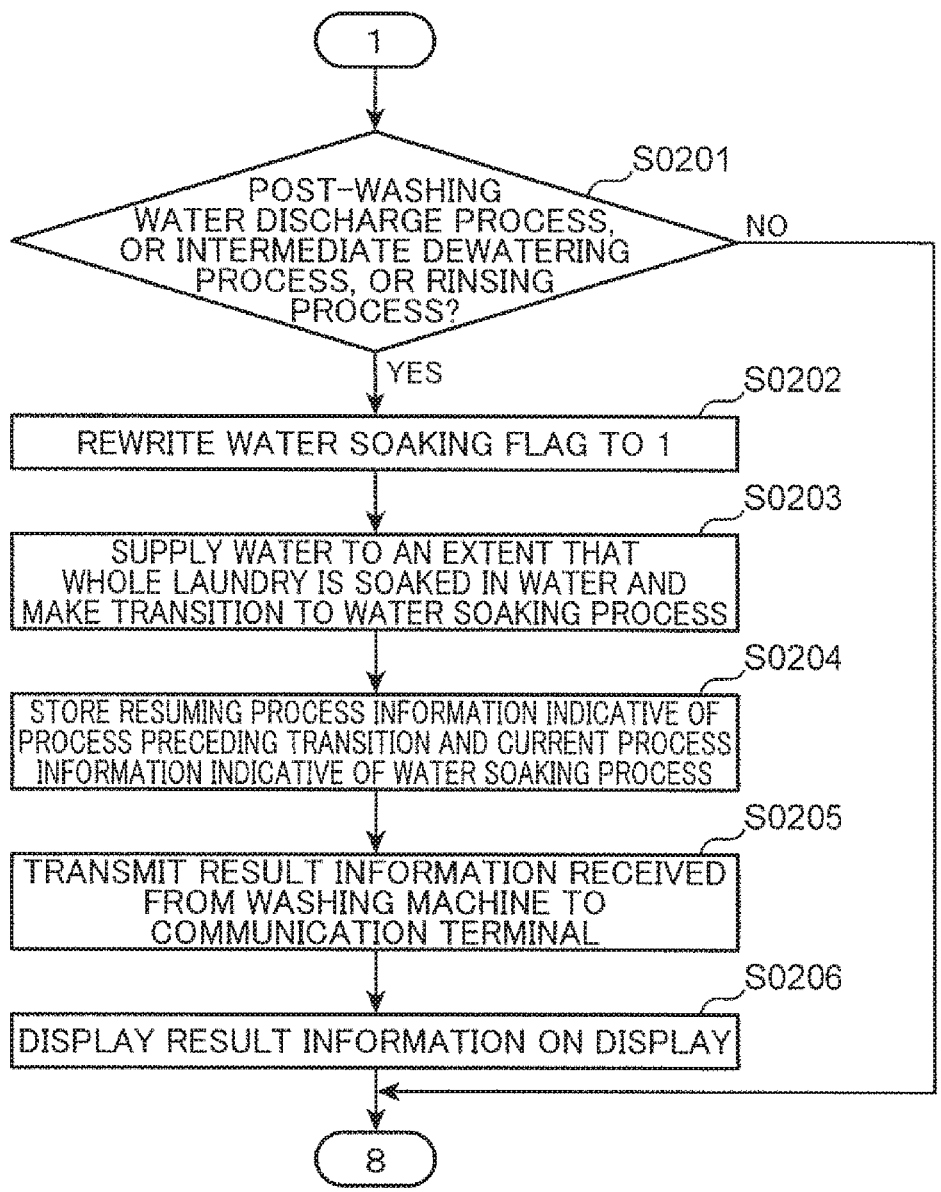
FIG. 6 is a flow chart showing one example of operation conducted when determination is made that home arrival time is longer than remaining washing time.

FIG. 6 is a flow chart showing one example of peration conducted when determination is made that home arrival time is longer than remaining washing time. It is assumed that, in Step S0110, the control determination portion 46 determines that the home arrival time is longer than the remaining washing time (YES in Step S0110).

In this ease, as shown in FIG. 6, the control determination portion 46 refers to the status information obtained in Step S0105 (FIG. 5) to determine whether the washing machine 1 is in the post-washing water discharge process, in the intermediate dewatering process, in the rinsing process, at a completion time point of the post-washing water discharge process, or at a completion time point of the intermediate dewatering process (Step S0201).

In Step S0201, when determining that the washing machine 1 is in the post-washing water discharge process, in the intermediate dewatering process, in the rinsing process, at a completion time point of the post-washing water discharge process, or at a completion time point of the intermediate dewatering process (YES in Step S0201), the control determination portion 46 rewrites a water soaking flag stored in the memory or the like provided in the service server 44 to "1" (Step S0202). The water soaking flag is a flag indicating whether or not transition of the current process of the washing machine 1 to the water soaking process is to be made in order to prevent growth of various bacteria, the growth being caused by contact of laundry with air in the semi-dried state. The water soaking flag is assumed to be set to "1" when the process of the washing machine 1 is caused to transition to the water soaking process.

After Step S0202, the control determination portion 46 generates a control command which instructs the washing machine 1 to interrupt the currently executed process (hereinafter, referred to as the current process) and supply water to an extent that the whole laundry is soaked in water to make transition to the water soaking process. Then, the control determination portion 46 transmits the generated control command to the washing machine 1 via the washing machine communication portion 47 (Step S0203). In other words, Step S0203 corresponds to one example of generating instruction information for adding the first washing process of soaking laundry in water and transmitting the generated instruction information to the washing machine 1 in the present disclosure.

As a result, in the washing machine 1, when receiving the control command transmitted in Step S0203 via the communication unit 24, the control unit 20 controls the washing machine 1 to interrupt the currently executed process, supply water to an extent that the whole laundry is soaked in water, and make transition to the water soaking process according to the received control command. Thereafter, the control unit 20 returns, to the service server 44 via the communication unit 24, result information including control result information indicating that control has been conducted according to the received control command and status information indicating that the current process of the washing machine 1 is the water soaking process. The control result information includes information indicating whether or not control indicated by the control command has normally ended, and when the control indicated by the control command abnormally ends, includes information indicative of an occurrence position of the abnormality and contents of the same, and the like.

After the execution of Step S0203, the control determination portion 46 stores information indicative of a process having been executed before the transition to the water soaking process as resuming process information in the memory and stores information indicative of the water soaking process as current process information (Step S0204). The resuming process information is information indicative of a process to be executed by the washing machine 1 when causing the washing machine 1 to resume washing. The current process information is information indicative of a process being currently executed by the washing machine 1.

Then, after control is conducted according to the control command transmitted in Step S0203 in the washing machine 1, when receiving result information including control result information and status information from the washing machine 1 via the washing machine communication portion 47, the control determination portion 46 transmits the received result information to the communication terminal 30 via the network communication portion 45 (Step S0205).

In the communication terminal 30, when receiving the result information transmitted in Step S0205 via the data transmission/reception portion 34, the command generation portion 36 causes the screen display portion 37 to display, on the display 32, the control result information and the status information included in the received result information (Step S0206). As a result, the user is notified of a control result in the waShing machine 1 which is indicated by the displayed control result information and the current process of the washing machine 1 indicated by the displayed status information.

After Step S0206 or in Step S0201, in a case where the washing machine 1 is in none of the post-washing water discharge process, the intermediate dewatering process, the rinsing process, a completion time point of the post-washing water discharge process, or a completion time point of the intermediate dewatering process (NO in Step S0201), the processing in Step S0101 (FIG. 5) and the following steps will be executed.

(Control During Water Soaking Process)

Next, processing in Step S0108 and the following steps shown in FIG. 5 will be described. As shown in FIG. 5, in Step S0108, the control determination portion 46 determines whether or not the water soaking flag stored in the memory is "1" (Step S0108). In. Step S0108, when it is determined that the water soaking flag is not "1" (NO in Step S0108), the processing in Step S0109 and the following step will be executed.

Figure 7:
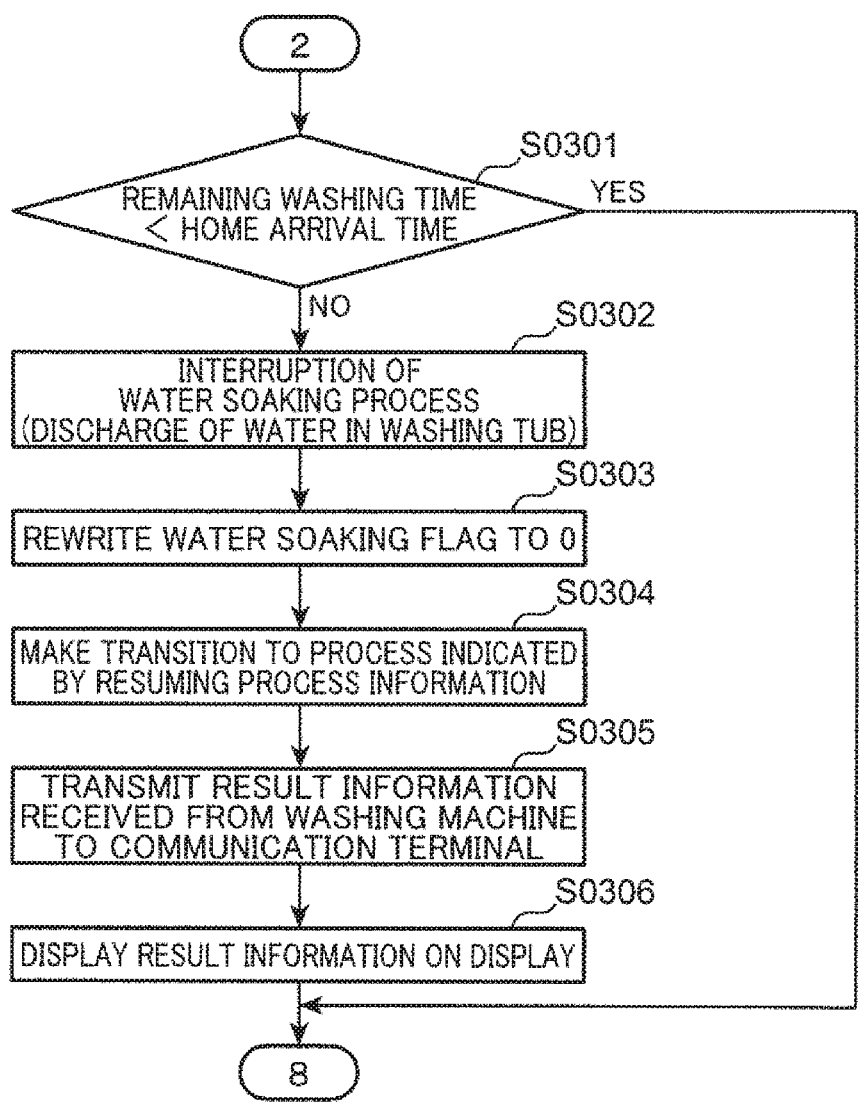
FIG. 7 is a flow chart showing one example of operation conducted in a case where a water soaking flag is set to 1.

FIG. 7 is a flow chart showing one example of operation conducted in a case where the water soaking flag is set to 1. It is assumed that the control determination portion 46 determines that the water soaking flag stored in the memory is "1" (YES in Step S0108).

In this case, as shown in FIG. 7, the control determination portion 46 determines whether or not home arrival time indicated by the home arrival time information obtained in the latest Step S0105 (FIG. 5) is longer than remaining washing time indicated by the remaining washing time information obtained in the latest Step S0105 (Step S0301).

In Step S0301, when it is determined that the home arrival time is longer than the remaining washing time (YES in Step S0301), the processing in Step S0101 (FIG. 5) and the following steps will be executed. In this case, the water soaking process is continued in the washing machine 1.

On the other hand, in Step S0301, in a case where the user comes near the user's house, and the control determination portion 46 determines that the home arrival time becomes shorter than the remaining washing time (NO in Step S0301), the control determination portion 46 generates a control command which instructs on interruption of the water soaking process and discharge of water in the washing tub 2. Then, the control determination portion 46 transmits the generated control command to the washing machine 1 via the washing machine communication portion 47 (Step S0302).

As a result, when receiving the control command transmitted in Step S0302 via the communication unit 24 in the washing machine 1, the control unit 20 controls the washing machine 1 to interrupt the water soaking process, and discharge water in the washing tub 2 according to the received control command. Thereafter, the control unit 20 returns result information including control result information indicating that control has been conducted according to the received control command to the service server 44 via the communication unit 24.

After Step S0302, the control determination portion 46 rewrites the water soaking flag stored in the memory to 0 (Step S0303).

Further, the control determination portion 46 generates a control command which instructs on transition to a process preceding transition to the water soaking process, the process being indicated by the resuming process information recorded in the memory, and transmits the generated control command to the washing machine 1 via the washing machine communication portion 47 (Step S0304).

As a result, in the washing machine 1, when receiving the control command transmitted in Step S0304 via the communication unit 24, the control unit 20 controls the washing machine 1 so as to make transition to a process preceding transition to the water soaking process according to the received control command. Thereafter, the control unit 20 returns, to the service server 44 via the communication unit 24. result information including control result information indicating that control has been conducted according to the received control command and status information indicating that the current process of the washing machine 1 is a process preceding transition to the water soaking process.

After the execution of Step S0304, when receiving the result information including the control result information and the status information from the washing machine 1 via the washing machine communication portion 47, the control determination portion 46 transmits the result information to the communication terminal 30 via the network communication portion 45 (Step S0305).

In the communication terminal 30, when receiving the result information transmitted in Step S0305 via the data transmission/reception portion 34, the command generation portion 36 causes the screen display portion 37 to display the control result information and the status information included in the received result information on the display 32 (Step S0306). This informs the user of the control result in the washing machine 1 indicated by the displayed control result information and the current process of the washing machine 1 indicated by the displayed status information. After Step S306, the processing in Step S0101 (FIG. 5) and the following steps will be executed.

As described above, the foregoing operation can prevent growth of various bacteria in laundry to some extent by soaking the laundry in water even when home arrival time of the user becomes longer more or less. However, in a case of considerable delay of home arrival time, it is better to further suppress growth of various bacteria in laundry by causing the washing machine 1 to execute not the water soaking process but the detergent soaking process as will be described later.

(Control of Transition to Detergent Soaking Process)

Next, the processing in Step S0109 and the following step shown in FIG. 5 will be described. As shown in FIG. 5, in Step S0109, the control determination portion 46 determines whether or not the home arrival time indicated by the home arrival time information obtained in Step S0105 satisfies a predetermined delay condition, thereby determining whether or not the home arrival time is considerably delayed (Step S0109).

Specifically, in Step S0109, the control determination portion 46 subtracts the remaining washing time indicated by the remaining washing time information obtained in Step S0105 from the home arrival time indicated by the home arrival time inthrmation obtained in Step S0105 as described above. In a case where the result of subtraction is a predetermined first time or more, the control determination portion 46 determines that the home arrival time is considerably delayed from the remaining washing time, and in a case where the result of subtraction is less than the first time, the control determination portion 46 determines that the home arrival time is not considerably delayed from the remaining washing time. The first time is set in advance to be, for example, time (e.g. 30 minutes) shorter than time generally required from start of washing until completion of washing (e.g. 45 minutes), and is stored in advance in the memory of the service server 44.

The first time may be set by a user. For example, in the communication terminal 30, in a case where the predetermined time is input by the user, the application 31 may transmit, to the service server 44 via the data transmission/reception portion 34, a control command which instructs on storage of the input predetermined time in the memory. Then, the control determination portion 46 may store the predetermined time in the memory according to the control command received via the network communication portion 45.

In Step S0109, when it is determined that the home arrival time is not considerably delayed from the remaining washing time (NO in Step S0109), the control determination portion 46 executes the processing in Step S0110 and the following steps.

Figure 8:
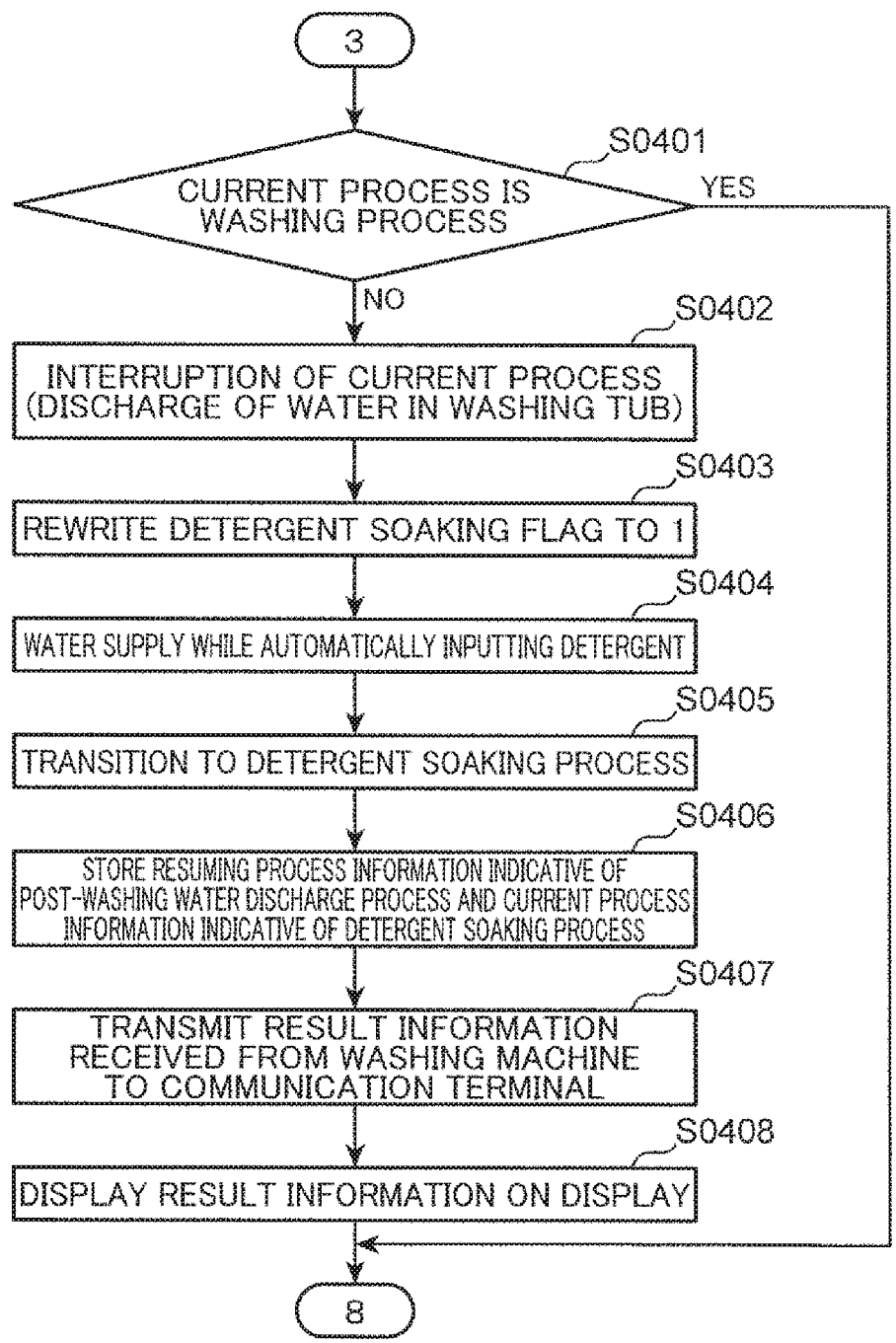
FIG. 8 is a flow chart showing one example of operation conducted in a case where home arrival time is considerably delayed.

FIG. 8 is a flow chart showing one example of operation conducted in a case where home arrival time is considerably delayed. It is assumed that in Step S0109, the control determination portion 46 determines that the home arrival time is considerably delayed from the remaining washing time (YES in Step S0109).

In this case, the control determination portion 46 deteiluines whether or not the current process indicated by the status information obtained in Step S0105 (FIG. 5) is the washing process (Step S0401) as shown in FIG. 8.

In Step S0401, when it is determined that the current process is the washing process (YES in Step S0401), the processing in Step S0101 (FIG. 5) and the following steps will be executed.

On the other hand, in Step S0401, when it is determined that the current process is not the washing process (NO in Step S0401), the control determination portion 46 generates a control command to instruct on interruption of the current process and discharge of water in the washing tub 2. Then, the control determination portion 46 transmits the generated control command to the washing machine 1 via the washing machine communication portion 47 (Step S0402).

As a result, when receiving the control command transmitted in Step S0402 via the communication unit 24 in the washing machine 1, the control unit 20 controls the washing machine 1 to interrupt the current process and discharge water in the washing tub 2 according to the received control command. Thereafter, the control unit 20 returns, to the service server 44 via the communication unit 24, result information including control result information indicating that the control has been conducted according to the received control command.

After Step S0402, the control determination portion 46 rewrites the detergent soaking flag stored in the memory to 1 (Step S0403).

Thereafter, the control determination portion 46 generates a control command which instructs on water supply while putting detergent into the washing tub 2 by executing the detergent automatic input processing. Then, the control determination portion 46 transmits the generated control command to the washing machine 1 via the washing machine communication portion 47 (Step S0404). The control determination portion 46 also generates a control command which instructs on transition to the detergent soaking process. Then, the control determination portion 46 transmits the generated control command to the washing machine 1 via the washing machine communication portion 47 (Step S0405).

As a result, when receiving the control command transmitted in Step S0404 and Step S0405 via the communication unit 24 in the washing machine 1, the control unit 20 controls the washing machine 1 to supply water while putting detergent into the washing tub 2. by executing the detergent automatic input processing and controls the washing machine 1 to make transition to the detergent soaking process according to the received control command. Thereafter, the control unit 20 returns, to the service server 44 via the communication unit 24, result information including control result information indicating that the control has been conducted according to the received control command and status information indicating that the current process of the washing machine 1 is the detergent soaking process.

Thereafter, the control determination portion 46 stores information indicative of the post-washing water discharge process as a process subsequent to the washing process as the resuming process information in the memory and stores information indicative of the detergent soaking process as the current process information (Step S0406).

Then, after the control is conducted according to the control command transmitted in Step S0404 in the washing machine 1, when receiving result information including control result information and status information from the washing machine 1 via the washing machine communication portion 47, the control detelmination portion 46 transmits the received result information to the communication terminal 30 via the network communication portion 45 (Step S0407).

In the communication terminal 30, when receiving the result information transmitted in Step S0405 via the data transmission/reception portion 34, the command generation portion 36 causes the screen display portion 37 to display the control result information and the status information included in the received result information on the display 32 (Step S0408). As a result, the user is notified of the control result in the washing machine 1 which is indicated by the displayed control result information and the current process of the washing machine 1 indicated by the displayed status information. After Step S0408, the processing in Step S0101 (FIG. 5) and the following steps will be executed.

As described above, in a case where home arrival time of the user is considerably delayed, the control unit 20 causes the washing machine 1 to transition to the detergent soaking process. As a result, soaking laundry in water containing detergent can further suppress growth of various bacteria in laundry. Also, in a case where the home arrival time is longer than the remaining washing time at the completion of the washing process to be described later, the control unit 20 may cause the washing machine 1 to transition to the detergent soaking process. In this case, when the washing machine 1 completes the washing process, the control unit 20 instructs the communication terminal 30 to calculate home arrival time via the Internet 43 (FIG. 4).

(Control of Transition to Detergent Soaking Process at Completion of Washing Process)

Figure 9:
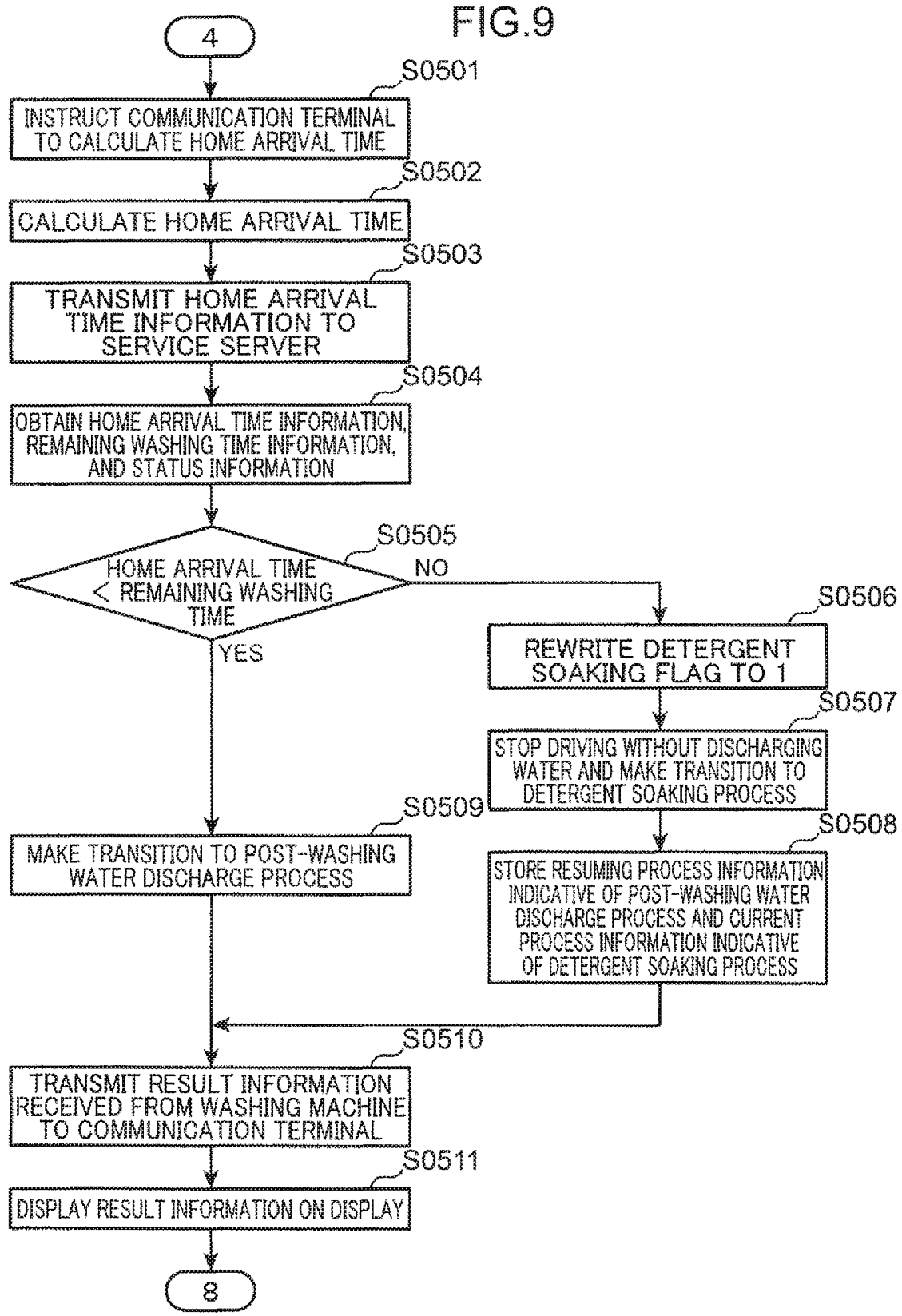
FIG. 9 is a flow chart showing one example of operation conducted at the completion of a washing process.

FIG. 9 is a flow chart showing one example of operation conducted at the completion of the washing process. When the washing process is completed in the washing machine 1, the control unit 20 transmits a control command including status information indicative of a completion time point of the washing process to the service server 44 via the washing machine communication portion 47. It is assumed that after the operation shown in FIG. 5 is started, in the service server 44, the control determination portion 46 received the control command including the status infounation indicative of the completion time point of the washing process from the washing machine 1 via the network communication portion 45 (YES in Step S0101).

In this case, as shown in FIG. 9, the control determination portion 46 transmits a control command which instructs on calculation of home arrival time to the communication terminal 30 via the network communication portion 45 (Step S0501).

In the communication terminal 30, when receiving the control command transmitted in Step S0501 via the data transmission/reception portion 34, the command generation portion 36 instructs the home arrival time calculation portion 35 to calculate home arrival time according to the received control command. Similarly to Step S0103 (FIG. 5), the home arrival time calculation portion 35 being instructed calculates home arrival time based on a distance between a position of a user's house and a current position of the user after obtaining positional information indicative of a current position of the communication terminal 30 from the UPS 33 (Step S0502).

Then, similarly to Step S0104 (FIG. 5), the command generation portion 36 generates a control command for causing the service server 44 to remote-control the washing machine 1, the control command including home arrival time information indicative of the home arrival time calculated in Step S0503. Then, the command generation portion 36 transmits the generated control command to the service server 44 via the data transmission/reception portion 34 (Step S0503).

In the service server 44, similarly to Step S0105 (FIG. 5), the control determination portion 46 obtains home arrival time information, remaining washing time information, and status information (Step S0504). Then, the control determination portion 46 determines whether or not the remaining washing time obtained in Step S0504 is longer than the home arrival time indicated by the home arrival time intbrmation obtained in Step S0504 (Step S0505).

When it is determined that the arrival time is longer than the remaining washing time (NO in Step S0505), the control determination portion 46 rewrites the detergent soaking flag stored in the memory or the like provided in the service server 44 to "1" (Step S0506).

After Step S0506, the control determination portion 46 generates a control command which instructs the washing machine 1 to stop without discharging water and to directly make transition to the detergent soaking process. Then, the control determination portion 46 transmits the generated control command to the washing machine 1 via the washing machine communication portion 47 (Step S0507). In other words, Step S0507 corresponds to one example of generating instruction information for changing time in the first washing process and transmitting the generated instruction information to the washing machine 1 in the present disclosure.

As a result, in the washing machine 1, when receiving the control command transmitted in Step S0507 via the communication unit 24, the control unit 20 controls the washing machine 1 to stop without discharging water and to directly make transition to the detergent soaking process according to the received control command. Thereafter, the control unit 20 returns, to the service server 44 via the communication unit 24, result information including control result information indicating that control has been conducted according to the received control command and status information indicating that the current process of the washing machine 1 is the detergent soaking process.

After Step S0507, the control determination portion 46 stores information indicative of the post-washing water discharge process as a process subsequent to the washing process in the memory as resuming process information, and stores information indicative of the detergent soaking process information as the current process information (Step S0508).

On the other hand, when it is determined that the home arrival time is shorter than the remaining washing time (YES in Step S0505), the control determination portion 46 generates a control command which instructs the washing machine 1 to make transition to the post-washing water discharge process. Then, the control determination portion 46 transmits the generated control command to the washing machine 1 via the washing machine communication portion 47 (Step S0509).

As a result, in the washing machine 1, when receiving the control command transmitted in Step S0509 via the communication unit 24, the control unit 20 controls the washing machine 1 to make transition to the post-washing water discharge process according to the received control command. Thereafter, the control unit 20 returns, to the service server 44 via the communication unit 24, result information including control result information indicating that control has been conducted according to the received control command and status information indicating that the current process of the washing machine 1 is the detergent soaking process.

Then, after the control is conducted in the washing machine 1 according to the control command transmitted in Step S0507 or Step S0509, when receiving result information including control result information and status information from the washing machine 1 via the washing machine communication portion 47, the control determination portion 46 transmits the received result information to the communication terminal 30 via the network communication portion 45 (Step S0510).

In the communication terminal 30, when receiving the result information transmitted in Step S0510 via the data transmission/reception portion 34, the command generation portion 36 causes the screen display portion 37 to display the control result information and the status information included in the received result information on the display 32 (Step S0511). As a result, the user is notified of the control result in the washing machine 1 indicated by the displayed control result inthrmation, and the current process of the washing machine 1 indicated by the displayed status information. After Step S0511, the processing in Step S0101 (FIG. 5) and the following steps will be executed.

(Control During Detergent Soaking Process)

Next, processing in Step S0107 and the following steps shown in FIG. 5 will be described. As shown in FIG. 5, in Step S0107, the control determination portion 46 determines whether or not the detergent soaking flag stored in the memory is "1" (Step S0107). In Step S0107, when it is determined that the detergent soaking flag is not "1" (NO in Step S0107), the processing in Step S0108 and the following steps will be executed.

Figure 10:
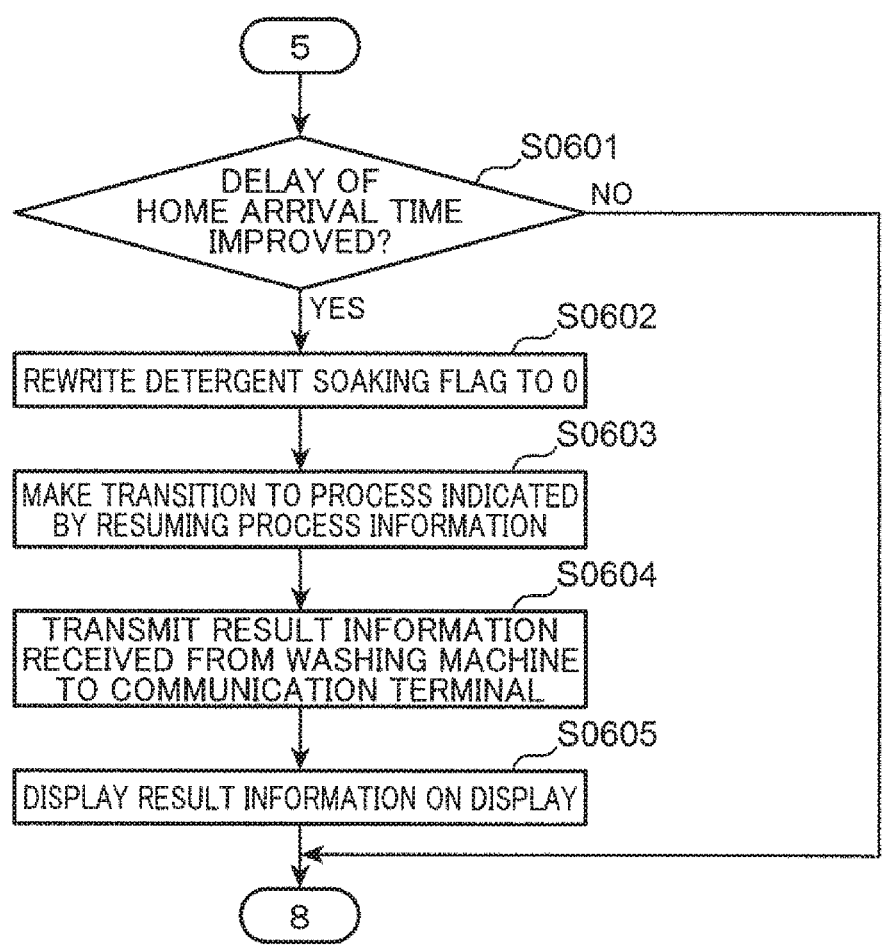
FIG. 10 is a flow chart showing one example of operation conducted in a case where a detergent soaking flag is set to 1.

FIG. 10 is a flow chart showing one example of operation conducted in a case where the detergent soaking flag is set to be 1. It is assumed that the control determination portion 46 determines that the detergent soaking flag stored in the memory is "1" (YES in Step S0107).

In this case, as shown in FIG. 10, the control determination portion 46 determines whether or not delay of the home arrival time indicated by the home arrival time information obtained in the latest Step S0105 (FIG. 5) is improved (Step S0601).

Specifically, in Step S0601, in a case where the control determination portion 46 determines that the delay of the home arrival time is improved when the home arrival time becomes a predetermined time or less. The predetermined time is determined, for example, to be time required from a start time point of a process executed subsequently to the detergent soaking process when washing is resumed, i.e., a process indicated by the resuming process information stored in the memory, until a start time point of the final dewatering process.

Alternatively, when determining in Step S0601 that the home arrival time indicated by the home arrival time information obtained in the latest Step S0105 (FIG. 5) becomes shorter than the remaining washing time indicated by the remaining washing time information obtained in the latest Step S0105, the control determination portion 46 may determine that delay of the home arrival time is improved.

Alternatively, the control determination portion 46 may also determine that the delay of the home arrival time is improved, when determining in Step S0601 that the home arrival time indicated by the home arrival time information obtained in the latest Step S0105 (FIG. 5) is reduced by a predetermined time from the home arrival time indicated by the home arrival time information obtained in Step S0105 (FIG. 5) one process preceding the latest Step S0105 (FIG. 5).

In Step S0601, when determination is made that the delay of the home arrival time is not improved (NO in Step S0601), the processing in Step S0101 (FIG. 5) and the following steps will be executed.

In Step S0601, when determining that the delay of the home arrival time is improved (YES in Step S0601), the control determination portion 46 rewrites the detergent soaking flag stored in the memory to 0 (Step S0602).

Next, the control determination portion 46 generates a control command which instructs on transition to a process indicated by the resuming process information recorded in the memory, and transmit the generated control command to the washing machine 1 via the washing machine communication portion 47 (Step S0603).

As a result, in the washing machine 1, when receiving the control command transmitted in Step S0603 via the communication unit 24, the control unit 20 controls the washing machine 1 to make transition to the post-washing water discharge process which is indicated by the resuming process information and is a process subsequent to the washing process according to the received control command. Thereafter, the control unit 20 returns, to the service server 44 via the communication unit 24, result information including control, result information indicating that control has been conducted according to the received control command and status information indicating that the current process of the washing machine 1 is a process indicated by the resuming process information.

Then, after the control is conducted according to the control command transmitted in the washing machine 1 in Step S0603, when receiving result information including control result information and status information from the washing machine 1 via the washing machine communication portion 47, the control determination portion 46 transmits the received result information to the communication terminal 30 via the network communication portion 45 (Step S0604).

In the communication terminal 30, when receiving the result information transmitted in Step S0604 via the data transmission/reception portion 34, the command generation portion 36 causes the screen display portion 37 to display the control result information and the status information included in the received result information on the display 32 (Step S0605). As a result, the user is notified of the control result in the washing machine 1 which is indicated by the displayed control result information and the current process of the washing machine 1 indicated by the displayed status information. After Step S0605, the processing in Step S0101 (FIG. 5) and the following steps will be executed.

As described in the foregoing, remote control of the washing machine 1 to execute the detergent soaking process prevents growth of various bacteria in laundry.

(Control of Transition to Final Dewatering Process at Completion of Rinsing Process)

Figure 11:
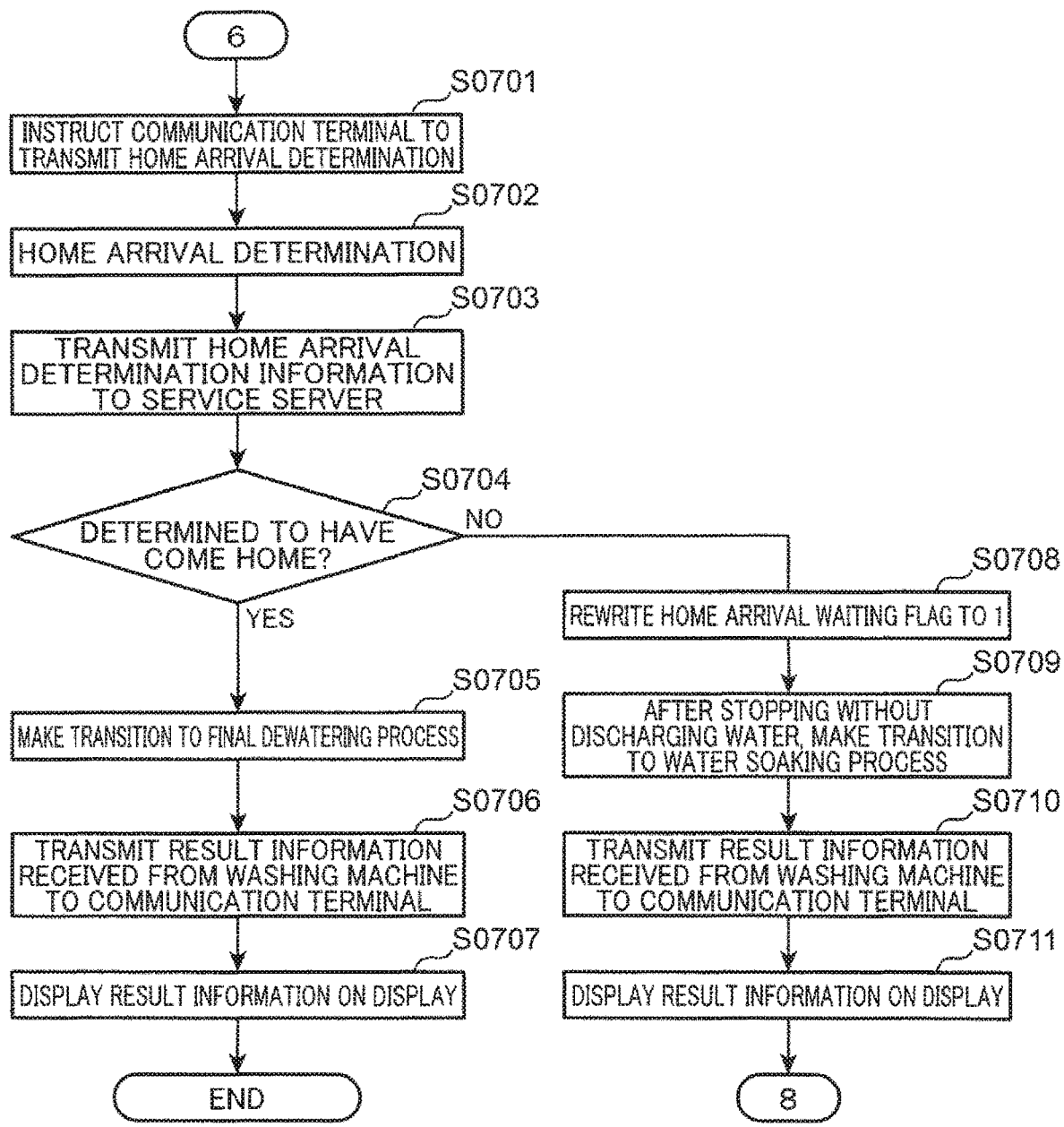
FIG. 11 is a flow chart showing one example of operation conducted at the completion of a rinsing process.

Lastly, description will be made of control to cause the washing machine 1 to transition to the final dewatering process simultaneously with the user coming home. FIG. 11 is a flow chart showing one example of operation conducted at the completion of the rinsing process. When the rinsing process is completed in the washing machine 1, the control unit 20 transmits a control command including status information indicative of a completion time point of the rinsing process to the service server 44 via the washing machine communication portion 47. It is assumed that after the operation shown in FIG. 5 is started, in the service server 44, the control determination portion 46 receives a control command including status information indicative of a completion time point of the rinsing process from the washing machine 1 via the network communication portion 45 (YES in Step S0102).

In this case, as shown in FIG. 11, the control determination portion 46 transmits a control command which instructs on transmission of a determination result as to whether or not the user has come home to the communication terminal 30 via the network communication portion 45 (Step S0701).

In the communication terminal 30, when receiving the control command transmitted in Step S0701 via the data transmissionireception portion 34, the command generation portion 36 instructs the home arrival time calculation portion 35 to determine whether or not the user has come home according to the received control command. After obtaining positional information indicative of the current position of the communication terminal 30 from the GPS 33, the home arrival time calculation portion 35 having received the instruction determines whether or not the user carrying the communication terminal 30 has come home based on a distance between a position of the user's house and the current position of the user (Step S0702).

Specifically, in Step S0702, assuming that the current position indicated by the obtained positional information is the current position of the user carrying the communication terminal 30, the home arrival time calculation portion 35 determines that the user has come home when a distance between the current position of the user and a position of the user's house is within a predetermined reference distance.

The command generation portion 36 generates a control command including home arrival determination information indicative of the determination result obtained in Step S0702, the control command being for the service server 44 to conduct remote control of the washing machine 1. Then, the command generation portion 36 transmits the izenerated control command to the service server 44 via the data transmissiontreception portion 34 (Step S0703).

In the service server 44, when receiving the control command transmitted in Step S0703 via the network communication portion 45, the control determination portion 46 obtains the home arrival determination information included in the received control command. Then, in a case where the obtained home arrival determination information indicates a determination result that the user has not come home (NO in Step S0704), the control determination portion 46 rewrites the home arrival waiting flag stored in the memory or the like provided in the service server 44 to "1" (Step S0708). The home arrival waiting flag is a flag indicating whether or not to cause the washing machine 1 to transition to the water soaking process immediately before the start of the final dewatering process. The home arrival waiting flag is assumed to be set to "1" in a case of causing the washing machine 1 to transition to the water soaking process immediately before the start of the final dewatering process.

After Step S0708, the control determination portion 46 generates a control command which instructs the washing machine 1 to stop without discharging water and to directly make transition to the water soaking process. Then, the control determination portion 46 transmits the generated control command to the washing machine 1 via the washing machine communication portion 47 (Step S0709). In other words, Step S0709 corresponds to one example of generating instruction information for changing time in the first washing process and transmitting the generated instruction information to the washing machine 1 in the present disclosure.

As a result, in the washing machine 1, when receiving the control command transmitted in Step S0709 via the communication unit 24, the control unit 20 controls the washing machine 1. to stop without discharging water and to directly make transition to the water soaking process according to the received control command. Thereafter, the control unit 20 returns, to the service server 44 via the communication unit 24, result information including control result information indicating that control has been conducted according to the received control command and status information indicating that the current process of the washing urachi the water soaking process.

Then, after the control conducted according to the control command transmitted in Step S0709 in the washing machine 1, when receiving the result information including the control result information and the status information from the washing machine 1 via the washing machine communication portion 47, the control determination portion 46 transmits the received result information to the communication terminal 30 via the network communication portion 45 (Step S0710).

In the communication terminal 30, when receiving the result information transmitted in Step S0709 via the data transmission/reception portion 34, the command generation portion 36 causes the screen display portion 37 to display the control result information and the status information included in the received result information on the display 32 (Step S0711). As a result, the user is notified of the control result in the washing machine 1 indicated by the displayed control result information and the current process of the washing machine 1 indicated by the displayed status information. After Step S0711, the processing in Step S0101 (FIG. 5) and the following steps will be executed.

On the other hand, in Step S704, in a ease where a determination result indicated by the home arrival determination information shows that the user has come home (YES in Step S0704), the control determination portion 46 generates a control command which instructs the washing machine 1 to make transition to the final dewatering process. Then, the control determination portion 46 transmits the generated control command to the washing machine 1 via the washing machine communication portion 47 (Step S0705).

As a result, in the washing machine 1, when receiving the control command transmitted in Step S0705 via the communication unit 24, the control unit 20 controls the washing machine 1 to make transition to the final dewatering process according to the received control command. Thereafter, the control unit 20 returns, to the service server 44 via the communication unit 24, result information including control result information indicating that control has been conducted according to the received control command and status information indicating that the current process of the washing machine 1 is the final dewatering process.

Then, after the control conducted according to the control command transmitted in Step S0705 in the washing machine 1, when receiving the result information including the control result information and the status information from the washing machine 3 via the washing machine communication portion 47, the control determination portion 46 transmits the received result information to the communication terminal 30 via the network communication portion 45 (Step S0706).

In the communication terminal 30, when receiving the result information transmitted in Step S0706 via the data transmission/reception portion 34, the command generation portion 36 causes the screen display portion 37 to display the control result information and the status information included in the received result information on the display 32 (Step S0707). As a result, the user is notified of the control result in the washing machine 1 indicated by the displayed control result information and the current process of the washing machine 1 indicated by the displayed status information. After Step S0707, the operation shown in FIG. 5 and FIG. 11 ends.

(Control During Detergent Soaking Process)

Next, the processing in Step S0106 and the following steps shown in FIG. 5 will he described. As shown in FIG. 5, in Step S0106, the control determination portion 46 determines whether or not the home arrival waiting flag stored in the memory is "1" (Step S0106). In Step S0106, when it is determined that the home arrival waiting flag is not "1" (NO in Step S0106), the processing in Step S0107 and the following steps will be executed.

FIG. 12 is a flow chart showing one example of operation conducted in a case where the home arrival waiting flag is set to 1. It is assumed that the control determination portion 46 determines that the home arrival waiting flag stored in the memory is "1" (YES in Step S0106).

In this case, processing in Steps S0801 to S0804 similar to Steps S0701 to S0704 (FIG. 11) will be executed as shown in FIG. 12. In Step S0804, in a case where the home arrival determination information obtained from the communication terminal 30 indicates a determination result that the user has not come home. (NO in Step S0804), the processing in Step S0101 (FIG. 5) and the following steps will be executed.

On the other hand, in Step S0804, in a case where the home arrival determination information obtained from the communication terminal 30 indicates a determination result that the user has come home (YES in Step S0804), the control determination portion 46 rewrites the home arrival waiting flag stored in the memory or the like provided in the service server 44 to "0" (Step S0805).

After Step S0805, the control determination portion 46 generates a control command which instructs the washing machine 1 to make transition to the final dewatering process. Then, the control determination portion 46 transmits the generated control command to the washing machine 1 via the washing machine communication portion 47 (Step S0806).

As a result, in the washing machine 1, when receiving the control command transmitted in Step S0806 via the communication unit 24, the control unit 20 controls the washing machine 1 to make transition to the final dewatering process according to the received control command. Thereafter, the control unit 20 returns, to the service server 44 via the communication unit 24, result information including control result information indicating that control has been conducted according to the received control command and status information indicating that the current process of the washing machine 1 is the final dewatering process.

Then, after the control conducted according to the control command transmitted in Step S0806 in the washing machine 1, when receiving the result information including the control result information and the status information from the washing machine 1 via the washing machine communication portion 47, the control determination portion 46 transmits the received result information to the communication terminal 30 via the network communication portion 45 (Step S0807).

In the communication terminal 30, when receiving the result information transmitted in Step S0807 via the data transmission/reception portion 34, the command generation portion 36 causes the screen display portion 37 to display the control result information and the status information included in the received result information on the display 32 (Step S0808). As a result, the user is notified of the control result in the washing machine 1 indicated by the displayed control result information and the current process of the washing machine 1 indicated by the displayed status information. After Step S0808, the operation shown in FIG. 5 and FIG. 12 ends.

By soaking laundry in until determination is made that the user has come home by the foregoing control, growth of various bacteria can be prevented. Then, simultaneously with the determination that the user has come home, the washing machine 1 is allowed to make transition to the final dewatering process.

The above-described aspects are for illustrative purpose only and are not to be construed as limiting the present disclosure. For example, modified embodiments shown below may be applied.

(1) Also in a case where the control determination portion 46 determines in Step S0201 (FIG. 6) that the washing machine 1 is in the final dewatering process, the processing in Step S0202 (FIG. 6) and the following steps may be executed.

(2) In Step S0109 (FIG. 5), in a case where the home arrival time indicated by the home arrival ime information obtained in Step S0105 (FIG. 5) is not reduced by predetermined second time or more, the control determination portion 46 may determine that the home arrival time is considerably delayed from the remaining washing time assuming that the user has not moved for the second time or more. The second time may be the same as the first time, or may be also set by user's operation similarly to the first time.

(3) In Step S0603 (FIG. 10), the control determination portion 46 may generate control command which instructs on transition to the washing process, not limited to the post-washing water discharge process as a process subsequent to the washing process, the process being indicated by the resuming process information recorded in the memory, and transmit the generated control command to the washing machine 1 via the washing machine communication portion 47. With this arrangement, the washing machine 1 may be configured to resume washing from the washing process without fail when delay of the home arrival time is improved during execution of the detergent soaking process by the washing machine 1.

(4) The control unit 20 may transmit the control command including status information indicating that the washing process has started to the service server 44 via the washing machine communication portion 47 not only when the washing process is completed in the washing machine 1 but also when the washing process has started in the washing machine 1.

To cope with the above arrangement, after the operation shown in FIG. 5 is started, the control determination portion 46 in the service server 44 responsively receives the control command including the status information indicating that the washing process has started from the washing machine 1 via the network communication portion 45. However, even in a case of not receiving the control command including status information indicative of a completion time point of the washing process, the processing in Step S0501 (FIG. 9) and the following steps may be executed.

As a result, with this arrangement, even in a case where home arrival time is longer than remaining washing time in the washing process by the washing machine 1, a control command may be generated for stopping drive of the washing machine 1 without water discharge in Step S0507 (FIG. 9) and making direct transition to the detergent soaking process. In this case, in Step S0508 (FIG. 9), the control determination portion 46 may store information indicative of the washing process in the memory as resuming process information and store information indicative of the detergent soaking process as current process information.

(5) In Step S0704 (FIG. 11), in a case where the control determination portion 46 shows a determination result that the home arrival determination information indicates that the user has not come home (NO in Step S704), the processing in Step S0103 (FIG. 5) and the following steps may be executed. Also when the control determination portion 46 responsively determines in Step S0201 (FIG. 6) that the washing machine 1 is at the completion time point of the rinsing process, the processing in Step S0202 (FIG. 6) and the following steps may be executed.

(6) The process of washing executed in the washing machine 1 may include a process other than the above-described washing process (the washing water supply process and the washing stirring process), post-washing water discharge process, intermediate dewatering process, rinsing process (the rinsing water supply process, the rinsing stirring process, and the rinsing dewatering process), and final dewatering process. The process subsequent to the washing process may be a process different from the post-washing water discharge process. The process immediately preceding transition to the final dewatering process may be a process different from the rinsing process.

To cope with the above arrangement, the control unit 20 may transmit, at completion of a process immediately preceding transition to the final dewatering process, a control command including status information indicative of a completion time point of the process to the service server 44 via the washing machine communication portion 47. Then, after the operation shown in FIG. 5 is started, in a case where the control determination portion 46 in the service server 44, receives, from the washing machine 1 via the network communication portion 45, a control command including status information indicative of a completion time point of the process, the processing in Step S0701 (FIG. 11) and the following steps may be executed.

(7) Similarly to Step S0601 (FIG. 10), the control determination portion 46 may determine in Step S0301 (FIG. 7) whether or not home arrival time indicated by the home arrival time information obtained in the latest Step S0105 (FIG. 5) becomes predetermined time or less. Then, in a case where the control determination portion 46 determines that the home arrival time becomes the predetermined time or less, the processing in Step S0302 (FIG. 7) and the following steps may be executed. The predetermined time may be determined, for example, to be time required from a start time point of a process executed subsequently to the water soaking process when the washing is resumed, i.e., a process preceding transition to the water soaking process, the process being indicated by the resuming process information stored in the memory, until a start time point of the final dewatering process.

(8) Immediately before Step S0601 (FIG. 10) or when determining that delay of the home arrival time is not improved in Step S0601 (NO in Step S0601), the control determination portion 46 may determine whether or not elapsed time from rewriting of the detergent soaking flag stored in the memory to "1" is predetermined third time or more.

Then, when determining that the elapsed time is the third time or more, the control determination portion 46 may execute the processing in Step S0602 and the following steps. In this case, execution of the detergent soaking process for a long period of time can be avoided. The third time is determined to be, for example, time (e.g. 30 minutes) shorter than time (e.g. 45 minutes) which is generally required from start to completion of washing. Also, the third time may be also set by user's operation.

(9) Immediately before Step S0301 (FIG. 7) or when determining that the home arrival time is longer than the remaining washing time in Step S0301 (YES in Step S0301), the control determination portion 46 may determine whether or not elapsed time from rewrite of the water soaking flag stored in the memory to "1" is predetermined fourth time or more.

Then, when determining that the elapsed time is the fourth time or more, the control determination portion 46 may execute the processing in Step S0302 and the following steps. In this case, execution of the water soaking process for a long period of time can be avoided. The fourth time is determined to be, for example, time (e.g. 30 minutes) shorter than time (e.g. 45 minutes) which is generally required from start to completion of washing. The fourth time may be also set by user's operation.

(10) It is assumed that the washing machine 1 is configured to be capable of executing the disinfection process of disinfecting the inside of the washing tub 2. In this case, it is assumed that in Step S0110 (FIG. 5), the home arrival time is determined to be longer than the remaining washing time (YES in Step S0110) and Step S0206 (FIG. 6) is executed. Alternatively, it is assumed that in Step S0201 (FIG. 6), determination is made that the washing machine 1 is in none of the post-washing water discharge process, the intermediate dewatering process, the rinsing stirring process, a completion time point of the post-washing water discharge process, and a completion time point of the intermediate dewatering process (NO in Step S0201).

In these cases, the control determination portion 46 may thrther generate a control command which instructs the washing machine 1 to interrupt a process being currently executed and make transition to the disinfection process. Then, the control determination portion 46 may transmit the generated control command to the washing machine 1 via the washing machine communication portion 47. Thereafter, the processing in Step S0101 (FIG. 5) and the following steps may be executed. In this case, the washing machine 1 is allowed to suppress growth of various bacteria in laundry by disinfecting laundry in the washing tub 2.

(11) It is assumed that the washing machine 1 is configured to be capable of executing the disinfection process of disinfecting the inside of the washing tub 2. In this case, it is assumed that in Step S0109 (FIG. 5), the home arrival time is determined to be considerably delayed from the remaining washing time (YES in Step S0109) and S0408 (FIG. 8) is executed. Alternatively, it is assumed that in Step S0401 (FIG. 8), the current process is determined to he the washing process (YES in Step S0401).

In these cases, the control determination portion 46 may further generate a control command which instructs the washing machine 1 to interrupt a process being currently executed and make transition to the disinfection process. Then, the control determination portion 46 may transmit the generated control command to the washing machine 1 via the washing machine communication portion 47. Thereafter, the processing in Step S0101 (FIG. 5) and the following steps may be executed. In this case, the washing machine 1 is allowed to suppress growth of various bacteria in laundry by disinfecting laundry in the washing tub 2.

(12) The control unit 20 may be configured to function in the same manner as the control determination portion 46 by using the communication unit 24 in place of the network communication portion 45 and the washing machine communication portion 47.

According to the present disclosure, a washing machine can be remote-controlled so as to complete washing in time for user's arrival at home while suppressing growth of various bacteria in laundry. Therefore, the present disclosure is applicable to remote control of home and industrial-use washing machines and washing and drying machines.

This application is based on Japanese Patent application No. 2018-071774 filed its Japan Patent Office on Apr. 3, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A control method for controlling a washing machine by utilizing a computer, wherein the washing machine and the computer are operatively connected via a communication network, the method comprising:

obtaining a position, by utilizing a sensor, of a user of a washing machine and an installation position of the washing machine;

obtaining arrival time required for the user to arrive at the installation position based on the position of the user and the installation position;

obtaining operation information of the washing machine;

determining whether the washing machine is performing washing based on the operation information;

obtaining washing completion time required for the washing machine to complete washing when it is determined that the washing machine is performing washing;

generating instruction information for adding a first washing process of soaking laundry in water by the washing machine or for changing time in the first washing process in a case where the arrival time is longer than the washing completion time; and transmitting the generated instruction information to the washing machine, wherein the first washing process includes a detergent soaking process of soaking laundry in water in which detergent is dissolved, and in a case where the arrival time satisfies a predetermined delay condition, instruction information for making transition to the detergent soaking process is generated.

2. The control method according to claim 1, wherein in a case where the arrival time is longer than the washing completion time when the washing machine is in a washing process of washing laundry soaked in water in which detergent is dissolved or completes the washing process, instruction information for making transition to the detergent soaking process is generated.

3. The control method according to claim 1, wherein the first washing process includes a water soaking process of soaking laundry in water, and in a case where the arrival time is longer than the washing completion time when the washing machine is (i) in a water discharge process of discharging water from a washing tub, a dewatering process of dewatering laundry, or a rinsing process of rinsing laundry with water, or (ii) completes the water discharge process, the dewatering process, or the rinsing process, instruction information for making transition to the water soaking process is generated.

4. The control method according to claim 3, wherein the washing completion time is time required for the washing machine to complete washing from a process preceding transition to the water soaking process, and when the arrival time becomes shorter than the washing completion time during the water soaking process, instruction information for making transition to a process preceding transition to the water soaking process is generated.

5. The control method according to claim 4, wherein, further, in a case where, during the first washing process, the arrival time becomes shorter than time required for starting a final dewatering process from a process subsequent to the first washing process, instruction information for making transition to a process subsequent to the first washing process is generated.

6. The control method according to claim 3, wherein in a case where elapsed time from the transition to the water soaking process becomes a predetermined time or more during the water soaking process, instruction information for making transition to a process preceding transition to the water soaking process is generated.

7. The control method according to claim 1, wherein the predetermined delay condition includes a condition that the arrival time is longer than the washing completion time by predetermined first time or more.

8. The control method according to claim 1, wherein the arrival time is obtained at a predetermined time interval, and the predetermined delay condition includes a condition that the arrival time is not reduced by predetermined second time or more.

9. The control method according to claim 1, wherein the washing completion time is time required for the washing machine to complete washing from a process subsequent to a washing process of washing laundry soaked in water in which detergent is dissolved, and when the arrival time becomes shorter than the washing completion time during the detergent soaking process, instruction information for making transition to a process subsequent to the washing process is generated.

10. The control method according to claim 1, wherein at the completion of a process immediately preceding transition of the washing machine to a final dewatering process of dewatering laundry to complete washing, (i) in a case where a distance between the installation position and the position of the user is within a predetermined reference distance, instruction information for making transition to the final dewatering process is generated, and (ii) in a case where the distance is out of the predetermined reference distance, instruction information for making transition to the water soaking process is generated.

11. The control method according to claim 10, wherein after the transition to the water soaking process due to the distance being out of the reference distance, in a case where the distance becomes within the predetermined reference distance, instruction information for making transition to the final dewatering process is generated.

12. The control method according to claim 1, wherein in a case where elapsed time from the transition to the detergent soaking process becomes predetermined third time or more during the detergent soaking process, instruction information for making transition of the washing machine to a process subsequent to a washing process of washing laundry soaked in water in which detergent is dissolved is generated.

13. The control method according to claim 1, wherein in a case where the arrival time is longer than the washing completion time, instruction information for making transition to a disinfection process of disinfecting laundry in a washing tub is further generated.

14. The control method according to claim 13, wherein in a case where the arrival time satisfies a predetermined delay condition, instruction information for making transition to the disinfection process is generated.

* * * * *